United States Patent [19]
Flux et al.

[11] Patent Number: 5,056,954
[45] Date of Patent: Oct. 15, 1991

[54] RELEASABLE GRIPPING, LOCKING, COUPLING OR SUPPORT DEVICES

[75] Inventors: Peter R. Flux, Calne; Alan W. Tupper, Chippenham, both of Great Britain

[73] Assignee: Latchways Limited, Chippenham, United Kingdom

[21] Appl. No.: 383,311

[22] Filed: Jul. 20, 1989

[30] Foreign Application Priority Data

Jul. 21, 1988 [GB] United Kingdom ............... 8819928
Jan. 30, 1989 [GB] United Kingdom ............... 8901978

[51] Int. Cl.$^5$ ............................................. E04G 25/04
[52] U.S. Cl. ................................ 403/330; 403/322; 403/325; 24/611; 24/114.5
[58] Field of Search ........... 403/322, 325, 330, 105, 403/374; 24/114.5, 609, 611, 643, 635

[56] References Cited

U.S. PATENT DOCUMENTS

| | | | |
|---|---|---|---|
| 3,628,221 | 12/1971 | Pasbrig | 403/325 X |
| 3,718,951 | 3/1973 | Pasbrig | 403/322 |
| 4,644,617 | 2/1987 | Tupper et al. | 403/330 X |
| 4,709,454 | 12/1987 | Barnes | 403/322 X |
| 4,932,695 | 6/1990 | Pettit et al. | 292/DIG. 4 X |

FOREIGN PATENT DOCUMENTS

| | | |
|---|---|---|
| 1077068 | 7/1967 | United Kingdom . |
| 1121087 | 7/1968 | United Kingdom . |
| 1560491 | 2/1980 | United Kingdom . |
| 2133969 | 8/1984 | United Kingdom . |
| 2140495 | 12/1986 | United Kingdom . |

Primary Examiner—Peter M. Cuomo
Assistant Examiner—Franco S. DeLiguori
Attorney, Agent, or Firm—Frishauf, Holtz, Goodman & Woodward

[57] ABSTRACT

A releasable gripping or locking device having a body part for sliding cooperation with a rope to be releasably gripped or locked with respect to the body part. A gripping or locking member is movably mounted on the body part for movement between a free condition and a gripping or locking condition in which loading applied to the device is borne by the gripping or looking member. A control member is provided for controlling movement of the gripping or locking position. The control member includes telescoping components having interengageable latching elements which are actuated by relative movement between the device and the rope. The latching elements are adapted to be automatically engaged in a latched condition when these parts are moved relative to one another in a first direction by a predetermined amount and are brought automatically into an unlatched condition on a predetermined amount of relative movement therebetween from the latched condition in the first direction, allowing subsequent free relative movement of the telescoping components. The free, and gripping or locking, conditions of the gripping or locking member correspond respectively with the latched and unlatched conditions of the control member.

13 Claims, 20 Drawing Sheets

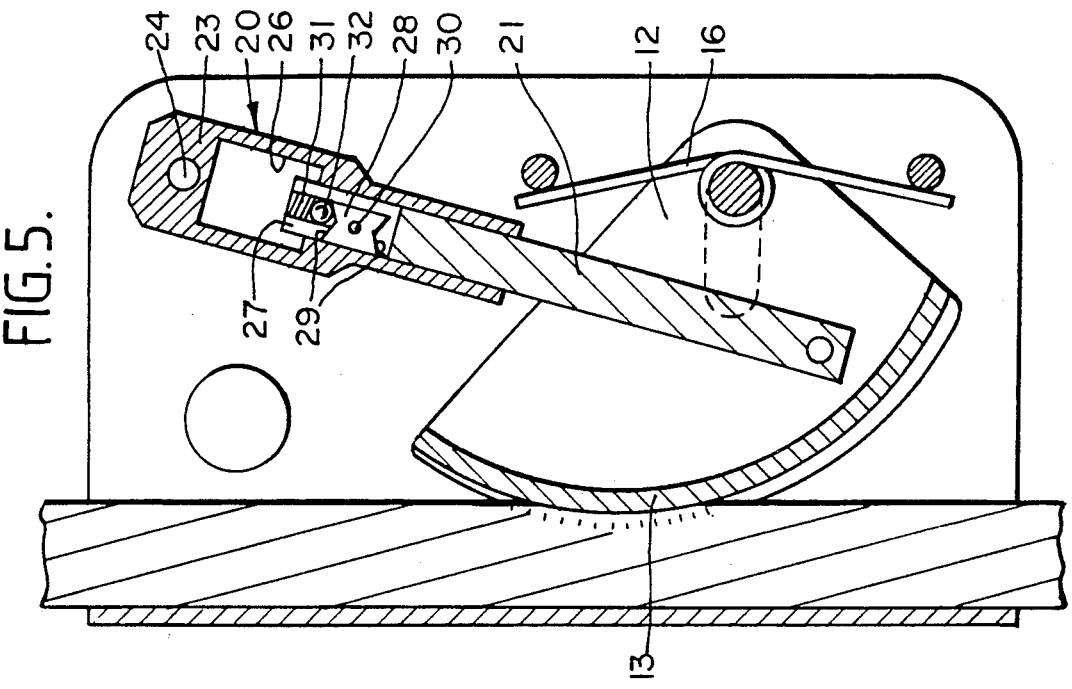
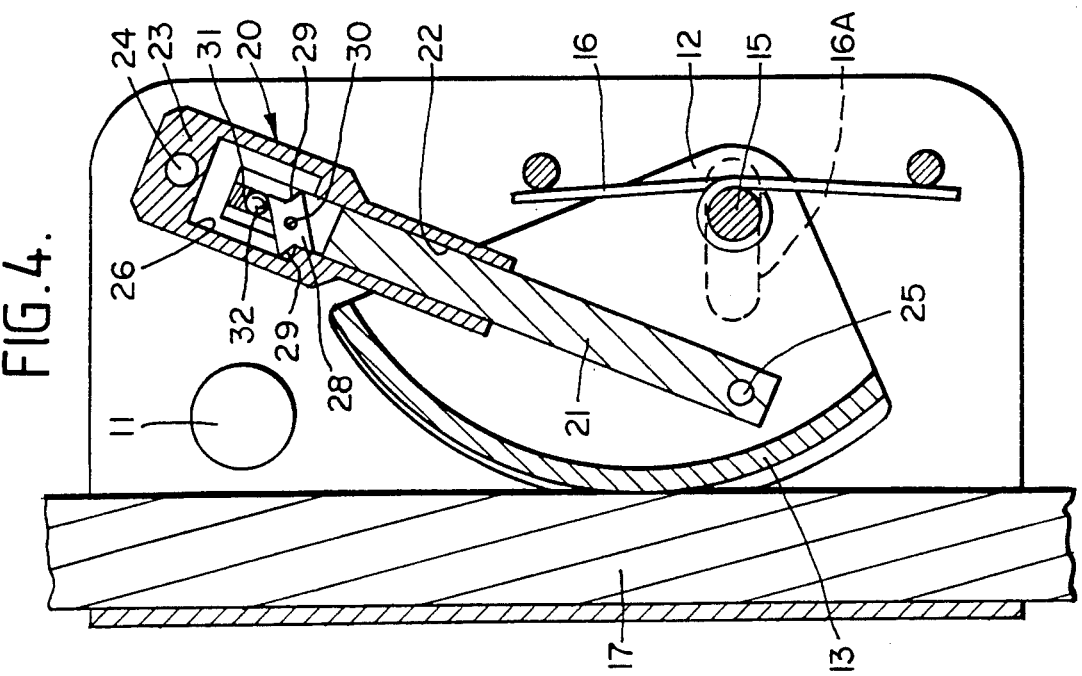

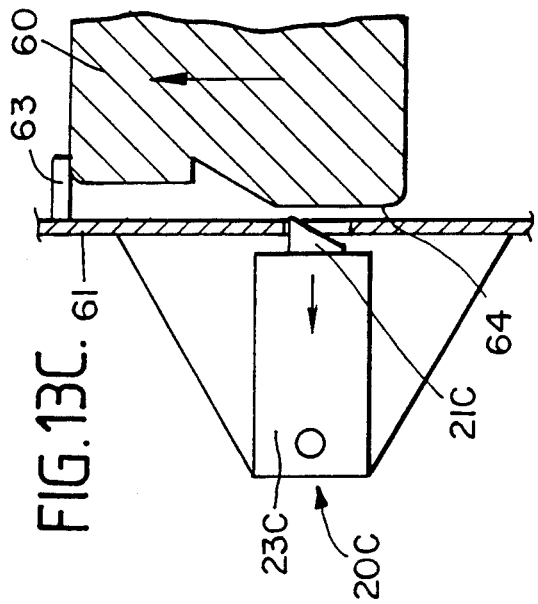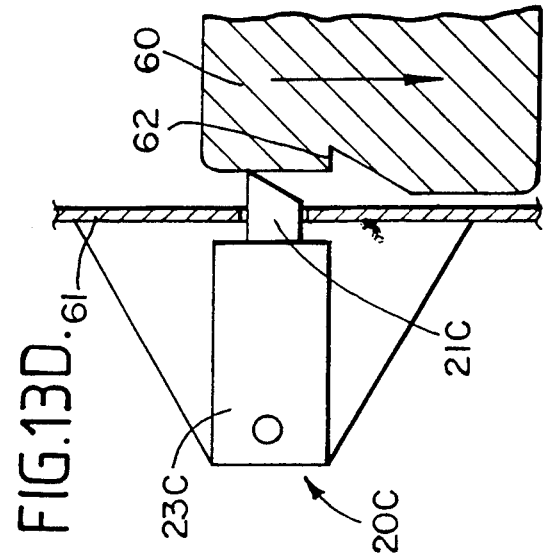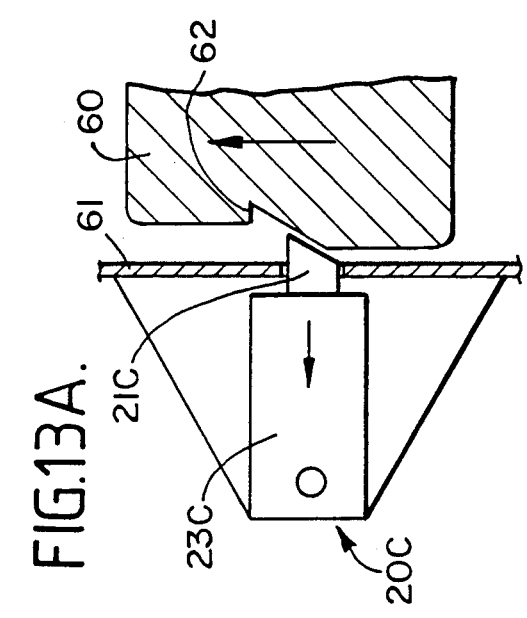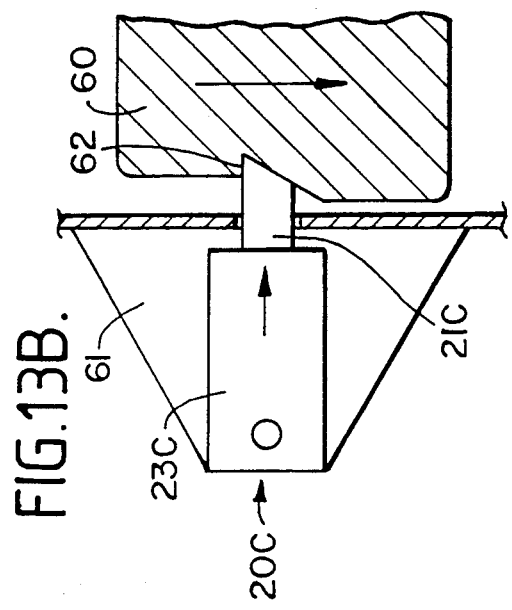

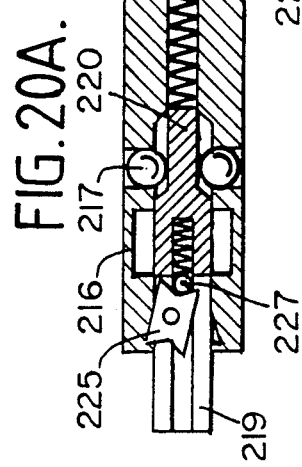
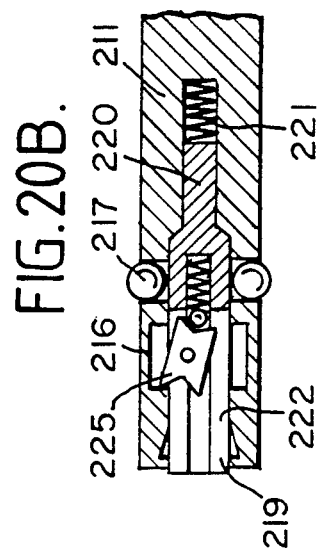
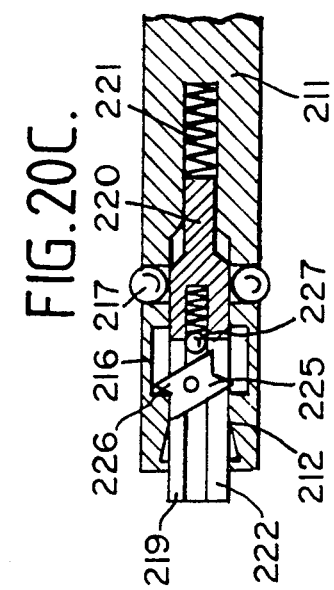
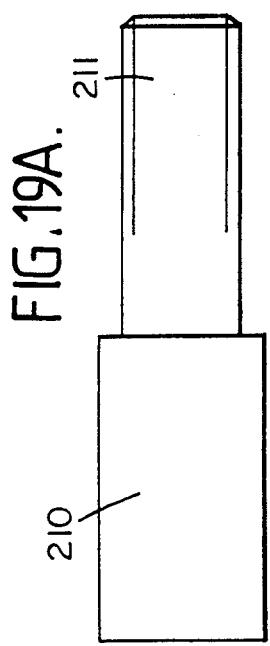
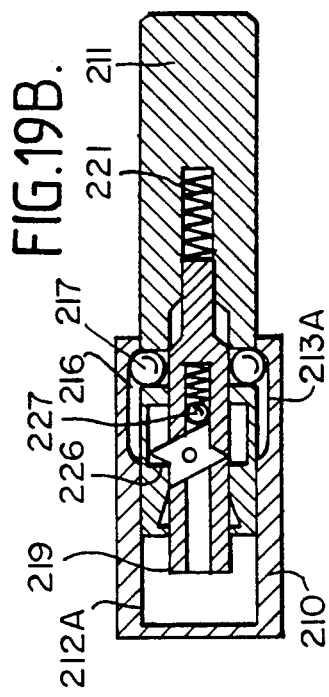
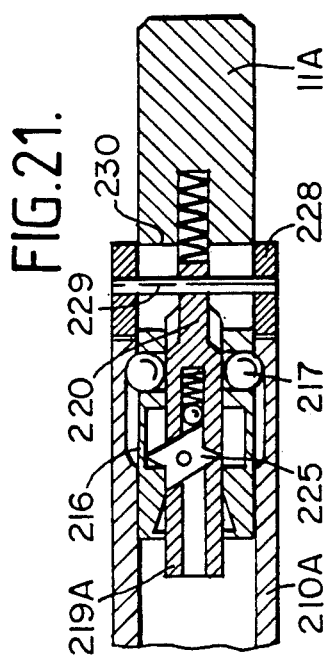

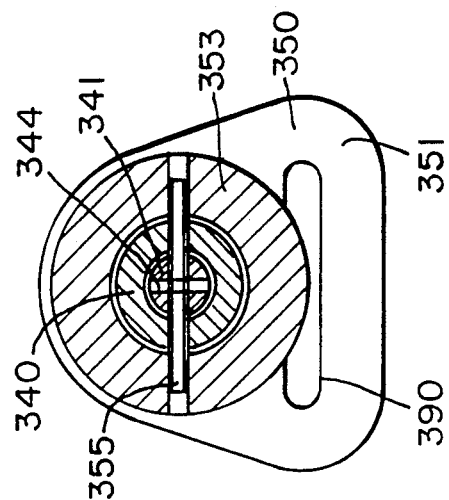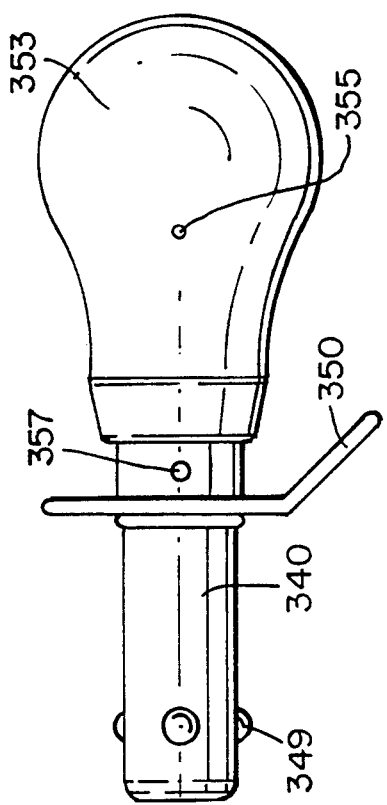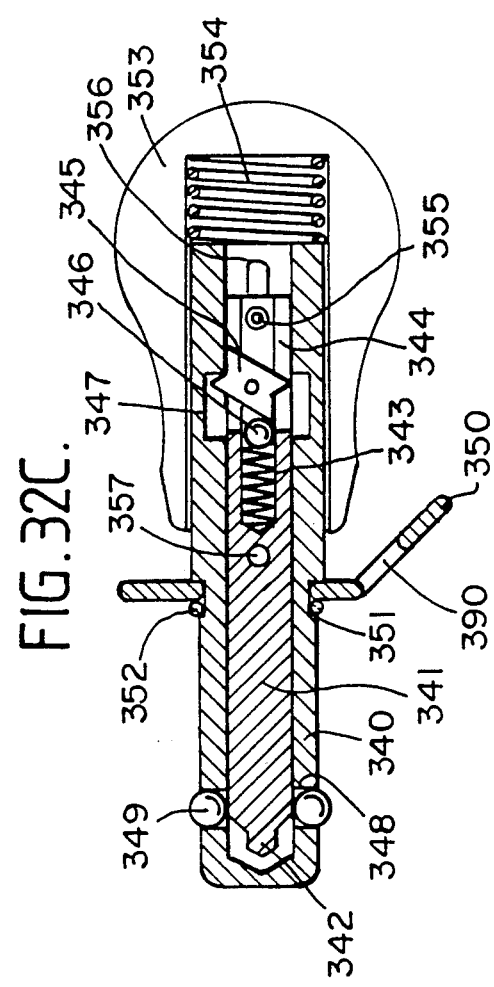

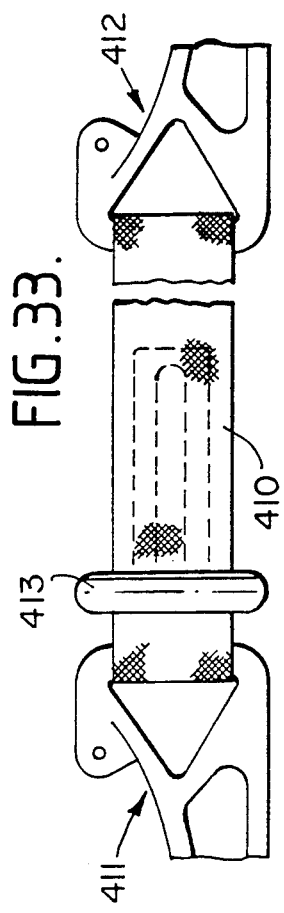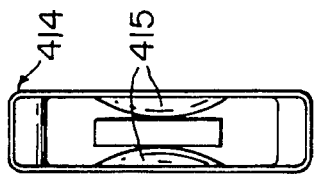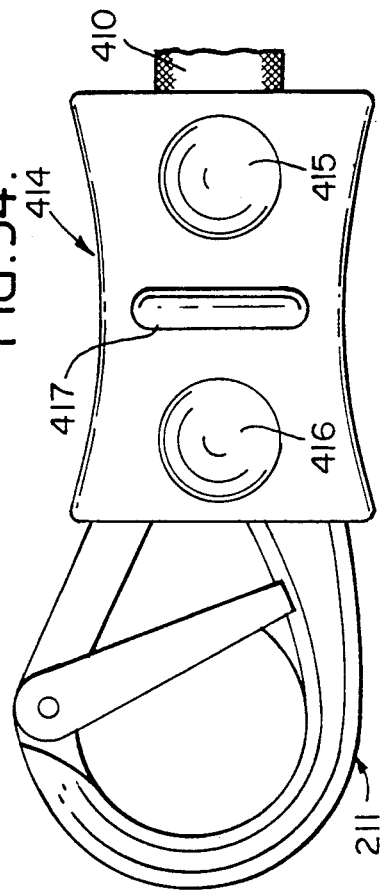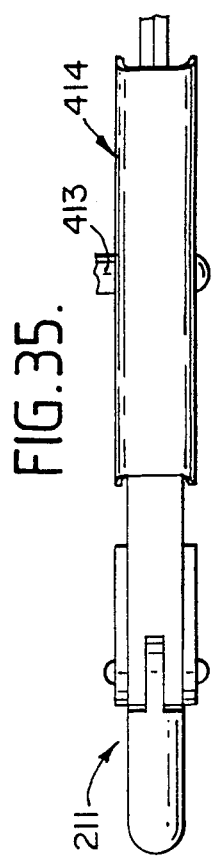

RELEASABLE GRIPPING, LOCKING, COUPLING OR SUPPORT DEVICES

FIELD AND BACKGROUND OF THE INVENTION

This invention relates to releasable gripping or locking devices for use particularly, but not exclusively, in releasably arresting or locking an elongate member, either flexible or rigid, against movement in one direction.

It also relates to releasable locking, coupling or support devices for use particularly, but not exclusively, in latching a load, e.g. in a raised position, so that tension in a hauling line can be relaxed, or releasably coupling together two parts, or releasably securing one part in or to another part or structure, or forming a rotary coupling between two parts, or providing a releasable load support.

U.S. Pat. No. 4,644,617, the disclosure of which is incorporated herein by reference, discloses releasable locking, coupling and support devices comprising two parts which are in, or can be brought into, a relatively slidable disposition, and interengageable latching means on the two parts. The latching means are engageable and disengageable automatically on relative movement of the parts in opposite directions. The latching means comprise an abutment on one of the parts, at least one rotary pawl on the other part to cooperate with the abutment in the latched condition and control means for positioning the pawl in a series of angular dispositions thereof during a latching or a release sequence of the latching means. The control means comprise resilient means provided on the same part as the pawl, to act on the periphery of the pawl, or a part associated therewith, to temporarily locate the pawl in said angular positions during the latching and release sequences.

In the devices of U.S. Pat. No. 4,644,617, the latching connection between the two parts is effected by the engagement of the pawl on one part with the abutment on the other part. The strength of the connection in the latched condition thereof depends on the strength of the pawl, requiring a relatively massive pawl for heavy load applications. Furthermore, when a single pawl is used there is an unbalanced seating of the latched parts. These disadvantages can be reduced to some extent by employing two or more latching pawls but this results in a more complicated construction.

SUMMARY OF THE INVENTION

The object of the invention is to provide a releasable locking, coupling or support device of the general type described above, in which the applied load, which can be supported by the device in the latched condition thereof, is not determined predominantly by the strength of the pawl or other similar latching control mechanism. Embodiments of the invention also provide gripping or locking devices in which the latching control mechanism can be completely enclosed.

The invention provides a releasable gripping or locking device comprising a body part for sliding cooperation with another part to be releasably gripped or locked with respect to the body part, gripping or locking means movably mounted on the body part for movement between a free condition, and a gripping or locking condition in which loading applied to the device is borne by said gripping or locking means, and control means for controlling movement of said gripping or locking member between said free position and said gripping or locking position, said control means including relatively slidable components having interengagable latching means which are actuated by relative movement of the components, said latching means being adapted to be automatically engaged in a latched condition when the components are moved relative to one another in a first direction by a predetermined amount so as to restrict subsequent relative movement in the same direction, or the opposite direction, respectively, and are brought automatically into an unlatched condition on a predetermined amount of relative movement from the latched condition in said opposite direction, or said first direction, respectively, allowing subsequent free relative movement of the components in said first direction, or said opposite direction, respectively; wherein said free and gripping or locking conditions of said gripping or locking means correspond with said latched and unlatched conditions, or vice versa, of said control means.

In some embodiments said latching means may comprise an abutment on one of the components and a rotary pawl mounted on the other component for rotation between positions in which it does and does not cooperate with said abutment on relative movement of the components and positioning means for positioning the pawl in a series of angular positions thereof during a latching or release sequence of said latching means, said pawl being rotatable through complete revolutions thereof, and said positioning means comprising resilient means provided on said other component and engaged with the periphery of the pawl or a part associated therewith to temporarily locate the pawl in said angular positions during said latching and release sequences.

The peripheral portion may have a generally parallelogram shape whereby said resilient means engage in succession each side of the parallelogram-shaped peripheralportion associated with the pawl as the pawl is rotated by engagement with and disengagement from said abutment so as to rotate and locate the pawl in the required angular position for the next step in a locking or release sequence.

The pawl may have a pair of opposed peripheral edges which are formed with recesses or notches to receive a corner portion of said abutment in the latched condition of the latching means.

The resilient means may comprise a control member and spring means acting thereon biassing the control member into engagement with the periphery of the pawl, or said part associated therewith.

In some arrangements, said gripping means may comprise a cam pivotally mounted on said body part and having a curved gripping surface shaped to cooperate with an opposed portion of the body part so as to narrow the gap therebetween on rotation of the cam in one direction so as to grip an elongate member extending in use therebetween. Pivotal mounting means for the cam may be slidably mounted on the body part for movement towards and away from said portion of the body part to facilitate threading of an elongate member through the device and to accommodate elongate members of different cross-sectional sizes, resilient means being provided to bias said pivotal mounting means towards said portion of the body part.

The cam may act on an elongate member engaged in use with the device, through a pressure bar interlinked with the cam and acted on by said curved gripping surface. In other arrangements, said gripping means may comprise a pressure bar movably towards and away from an opposed portion of the body part in a generally parallel relationship thereto by a pivotal linkage between the pressure bar and the body part. The pressure bar may be movably mounted on the linkage towards and away from said opposed portion of the body part to facilitate threading of an elongate member through the device and to accommodate elongate members of different cross-sectional sizes, the pressure bar being resiliently biassed towards said opposed portion of the body part.

In some of the disclosed arrangements, said relatively slidable components of said control means may be in the form of a telescopic strut pivotally mounted at one end thereof on the body part and at the other end thereof on said cam or said linkage to control the pivotal movement thereof.

In some arrangements, said latching means of said control means may act directly between said cam and said body part.

Moreover, a pair of said cams may be pivotally mounted on said body part in an opposed relationship such that pivoting of the cams to their gripping positions progressively narrows the gap between the gripping surfaces of the cams thereby effecting a positive gripping of an elongate member extending, in use, therebetween.

In further arrangements, said locking means may comprise a locking member slidably mounted in a casing mounted on the housing with said control means acting between said locking member and said casing, said body part being in the form of a tubular housing for slidably receiving a shuttle member with said locking member, projecting into the housing to engage the periphery of the shuttle member which has a peripheral recess formed to receive said locking member in the locking condition of said locking means and to cause said locking means to be brought into its free and locking conditions in accordance with sliding movements of the shuttle member in the housing.

In yet further arrangements, said body part may comprise a tubular housing for receiving a shuttle part having an engagement portion sliding disposed in the housing, said locking means comprising a toggle member having a cross-piece pivotally mounted with respect to the housing, one end portion of which can extend into the housing through an aperture in the wall thereof on rotation of the toggle member in one direction, and a leg portion depending from the cross-piece and having an end portion which can extend into the housing through an aperture in the wall thereof on rotation of the toggle member in the other direction, and said slidable components of said control means being in the form of a telescopic strut pivotally mounted at one end thereof with respect to the housing and at the other end thereof on the other end portion of the cross-piece of the toggle member, whereby sequential sliding movements of the shuttle part in the housing in opposite directions cause opposite ends of said engagement portion thereof to engage said cross-piece and leg of the toggle member in turn causing sequential free and locking conditions thereof under the control of said control means.

The invention provides a locking mechanism for a releasable locking, coupling or support device having relatively slidable parts to be releasably locked against relative movement in one direction, said mechanism comprising a pair of cooperating, relatively slidable components having interengageable latching means and locking means which are actuated by relative movement of the components, said latching means being adapted to be automatically engaged in a latched condition when the components are moved relative to one another in a first direction by a predetermined amount so as to restrict subsequent relative movement in the same direction, or the opposite direction, respectively, and are brought automatically into an unlatched condition on a predetermined amount of relative movement from the latched condition in said opposite direction, or said first direction, respectively, allowing subsequent free relative movement of the components in said first direction, or said opposite direction, respectively; and said locking means being movable generally transversely of the direction of relative sliding movement of said components between locked and unlocked conditions corresponding to latched and unlatched, or vice versa, conditions of said latching means.

The latching means preferably comprise an abutment on one of the components and a rotary pawl mounted on the other component for rotation between positions in which it does and does not cooperate with said abutment on relative movement of the components and control means for positioning the pawl in a series of angular positions thereof during a latching or release sequence of said latching means, said pawl being rotatable through complete revolutions thereof and said control means comprising resilient means provided on said other component and engaged with the periphery of the pawl or a part associated therewith to temporarily locate the pawl in said angular positions during said latching and release sequences.

The peripheral portion may have a generally parallelogram shape whereby said resilient means engage in succession each side of the parallelogram-shaped peripheral portion associated with the pawl as the pawl is rotated by engagement with and disengagement from said abutment so as to rotate and then locate the pawl in the required angular position for the next step in a locking or release sequence.

The pawl may have a pair of opposed edges which are formed with recesses or notches to receive a corner portion of said abutment in the latched condition of the latching means.

The resilient means may comprise a control member and spring means acting thereon biassing the control member into engagement with the periphery of the pawl, or said part associated therewith.

The locking means may comprise at least one locking member provided on one of the components for movement generally transverse to said relative sliding direction of the components and cam means provided on the other of the components adapted to act on the locking member and to maintain it in a locked position thereof and to permit the locking member to move to an unlocked position thereof in accordance with relative sliding movement of the components between positions in which said latching means are in a latched or unlatched condition, or vice versa.

The invention also provides attachment apparatus comprising a plug-in attachment device having a locking mechanism in accordance with the invention and a receptor socket part for recessing in a wall structure into which the attachment device may be releasably secured in use.

The invention further provides a safety harness or safety belt attachment system comprising attachment apparatus as aforesaid and a safety line or lanyard for connection to the safety harness or belt and having an end connector for attachment to the plug-in attachment device. In some embodiments a plurality of receptor sockets may be provided for location at spaced positions in a wall structure, and said safety line or lanyard may have end connectors at respective opposite ends thereof for attachment to respective plug-in attachment devices. The safety line or lanyard passes through an eyelet on the safety harness or belt which does not permit passage of either end connector thereof. Such apparatus permits a wearer of the safety belt or harness to make a series of plug-in connections across the face of a wall structure without, even temporarily, being detached from the wall structure.

Embodiments of the invention will now be described by way of example and with reference to the accompanying drawings, in which:

FIG. 4 is a vertical cross-section through the device of FIG. 1 shown in a released position;

FIG. 5 is a vertical cross-section through the device of FIG. 1 shown in a rope gripping condition;

FIGS. 13A–13D are diagrammatic illustrations of a locking assembly in accordance with the invention shown in four respective positions of a locking and release sequence of operation thereof;

Figure 15B:
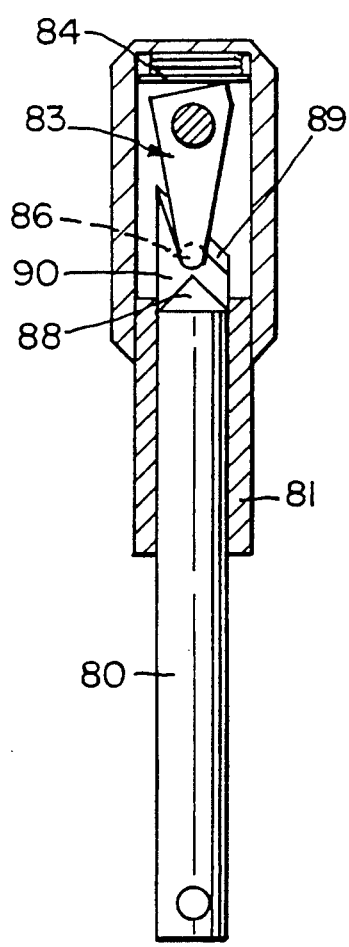
FIGS. 15A–15C are, respectively, a vertical cross-section of an alternative locking unit for use in devices according to the invention in a release condition, a similar section of the locking unit in its locked condition and a diagrammatic side view of the latching elements of the unit.
Figure 15C:
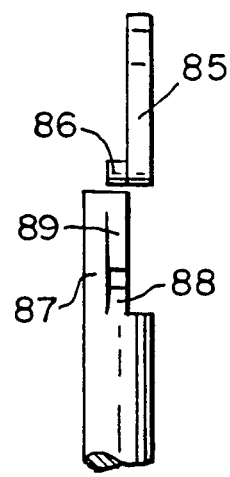
Figure 15A:
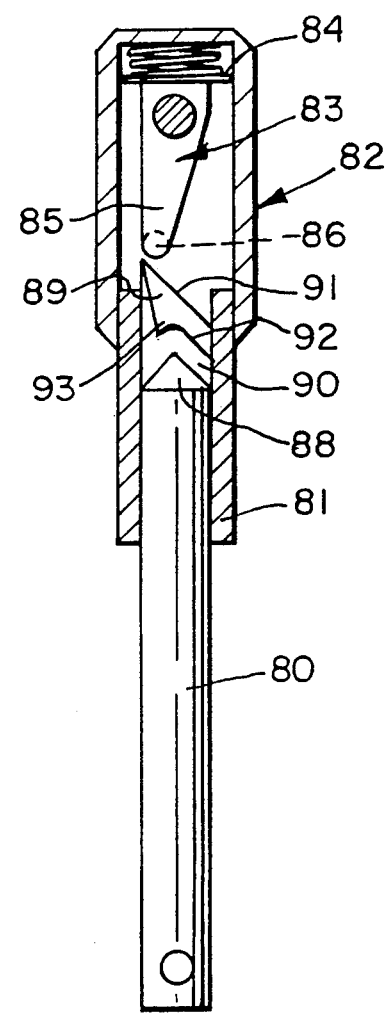
Figure 16F:
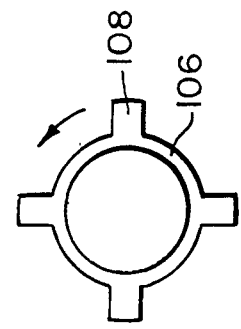
Figure 17:
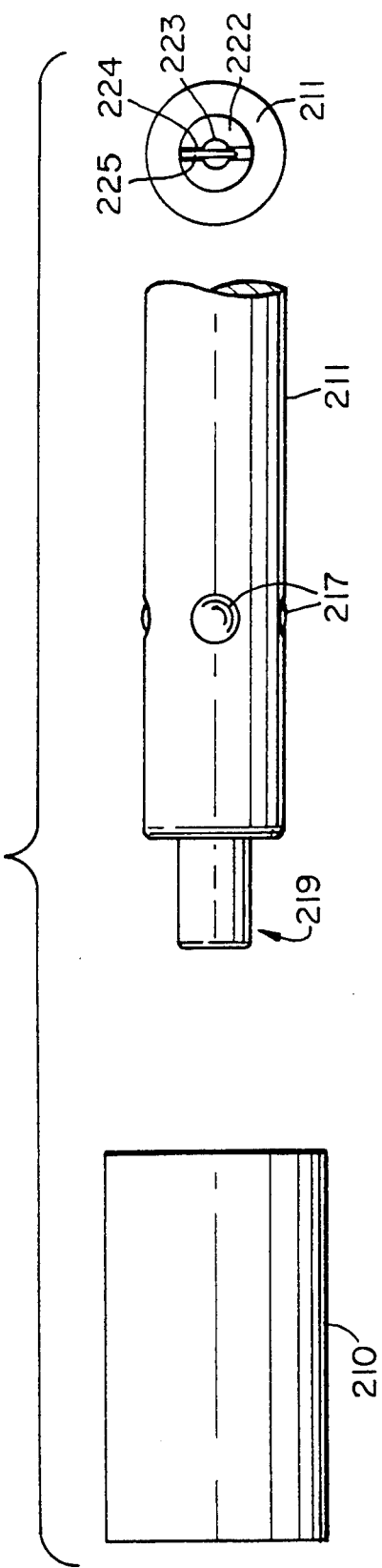
Figure 18:
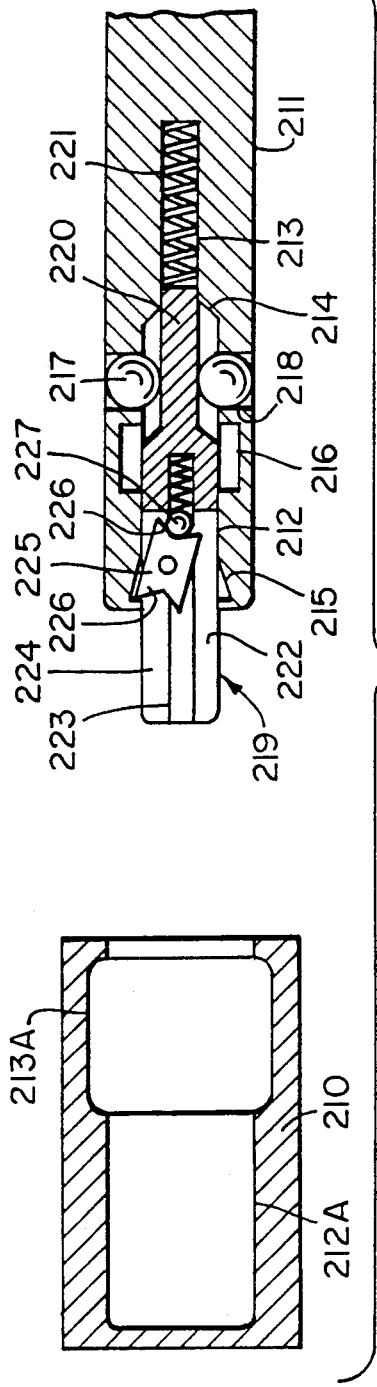
Figure 23C:
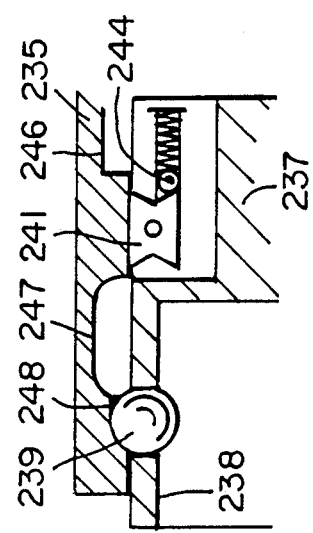
Figure 22B:
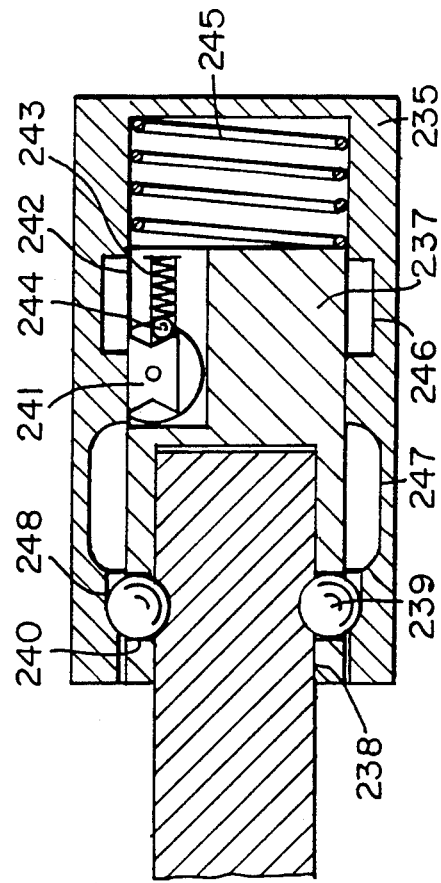
Figure 23B:
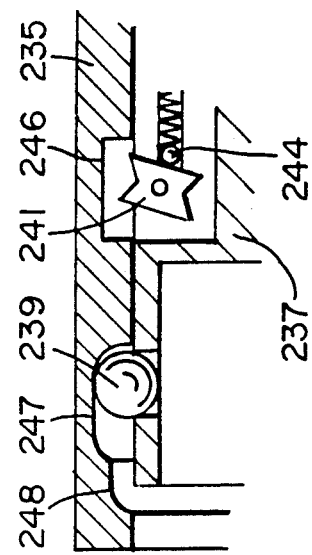
Figure 22A:
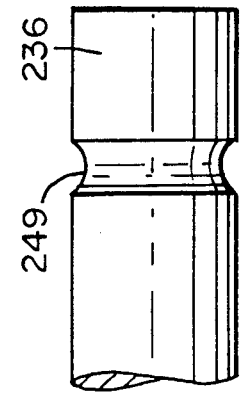
Figure 23A:
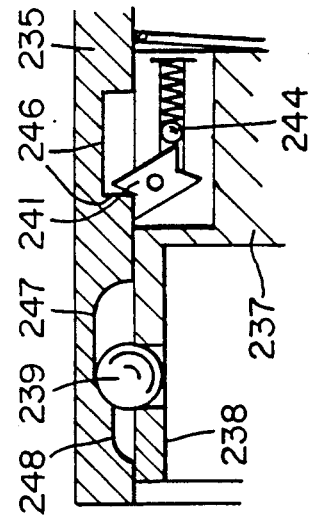
Figure 25:
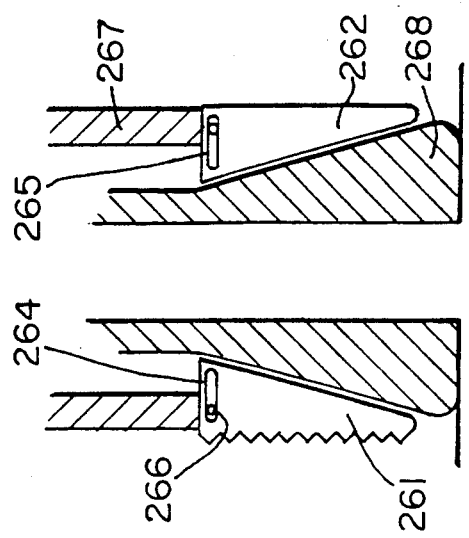
Figure 24B:
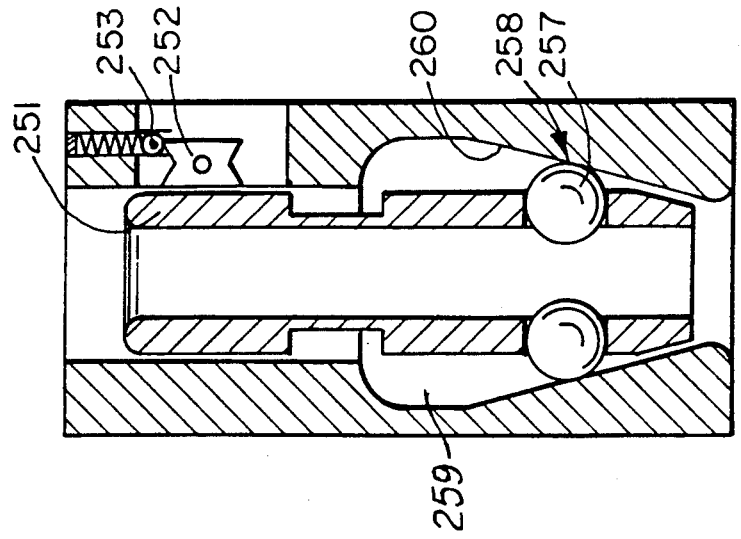
Figure 24A:
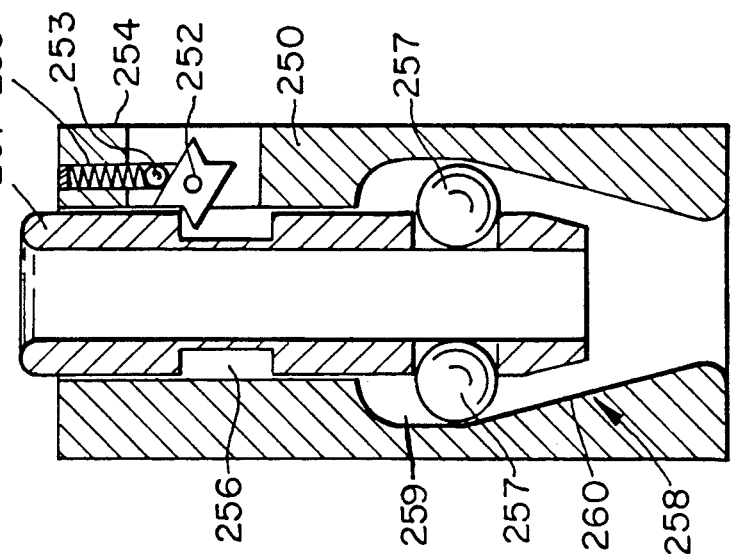
Figure 26A:
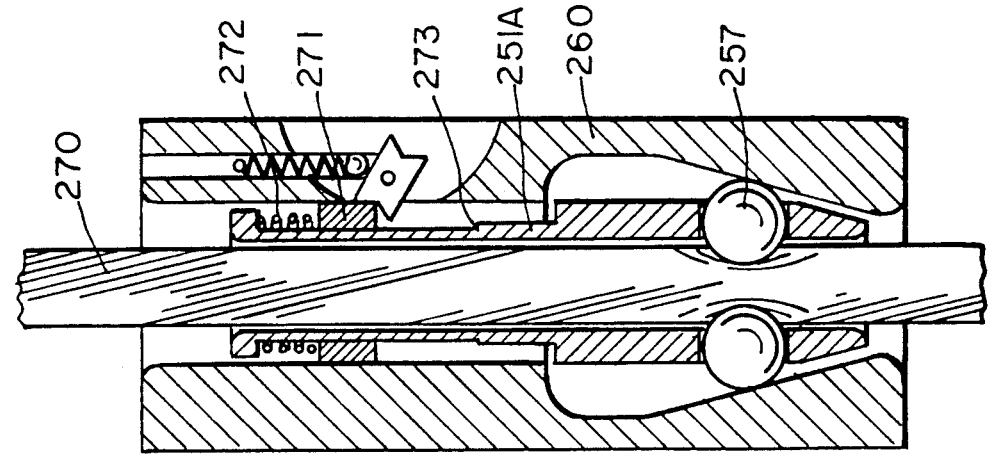
Figure 26B:
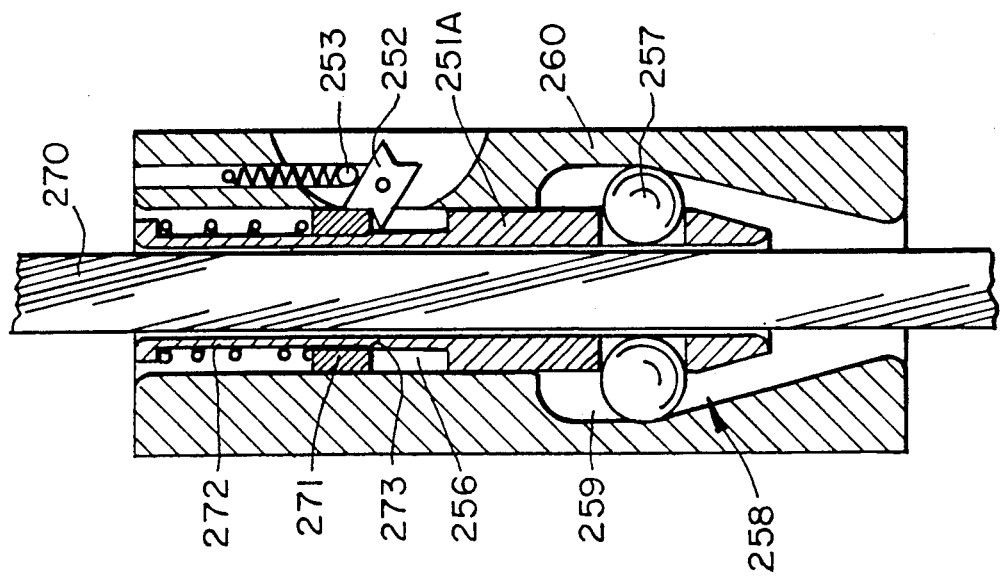
Figure 27A:
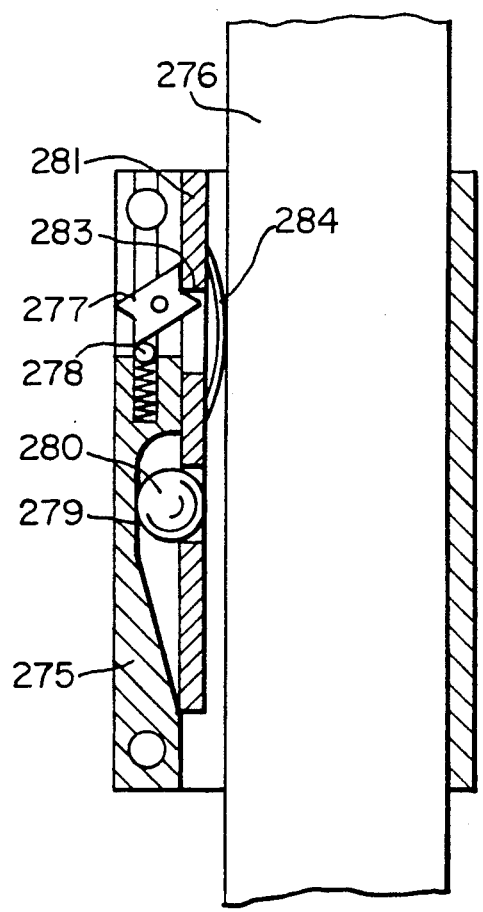
Figure 27B:
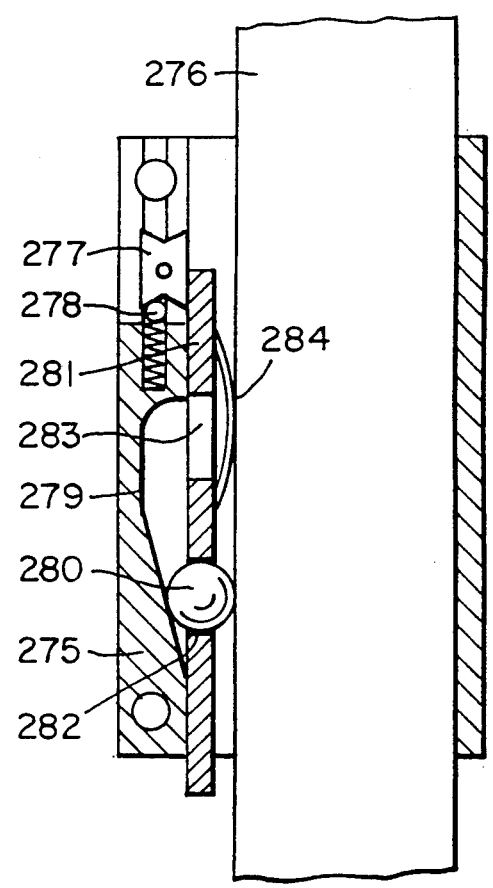
Figure 28A:
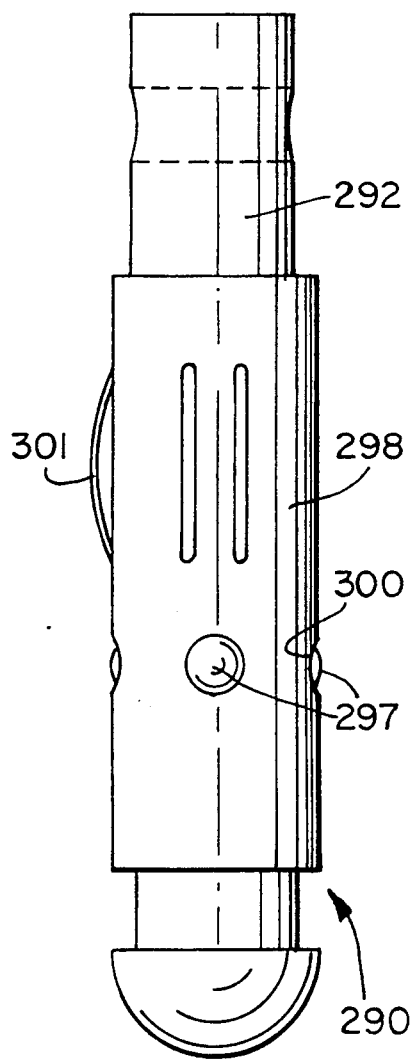
Figure 28B:
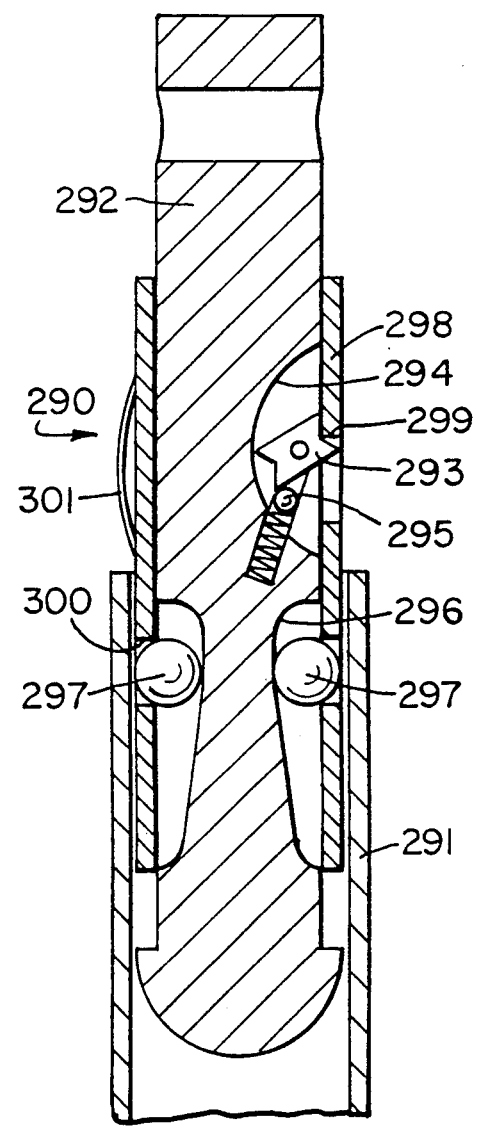
Figure 29A:
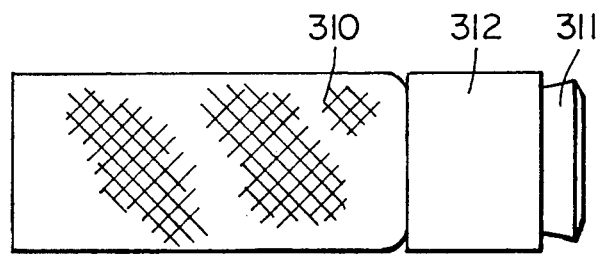
Figure 29B:
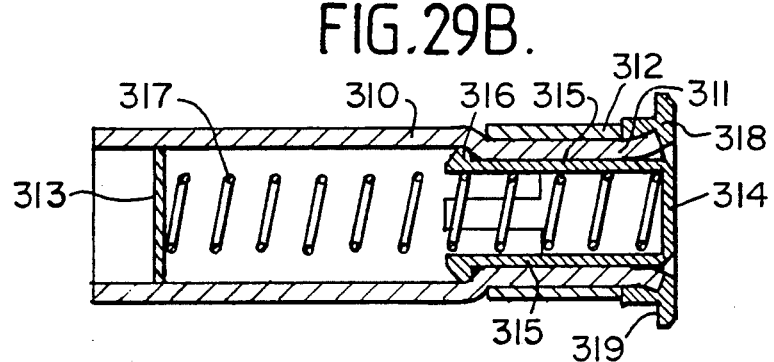
Figure 30:
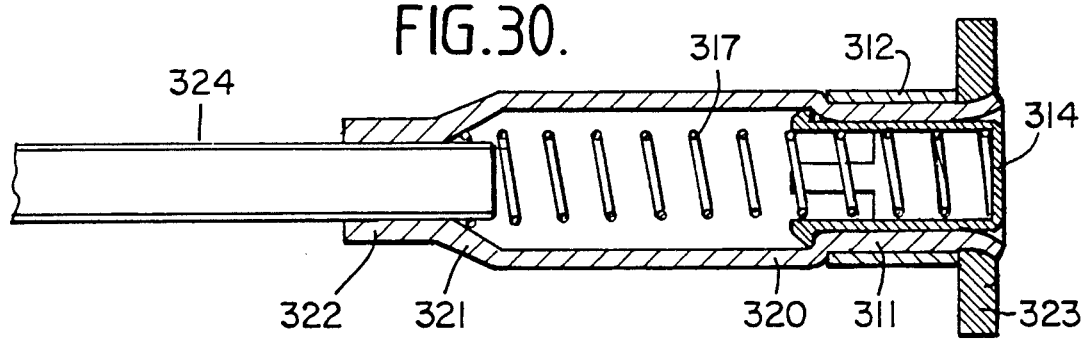
Figure 31A:
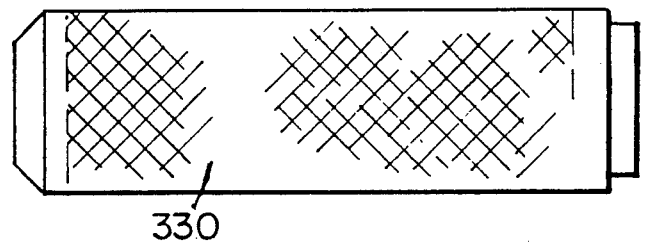
Figure 31B:
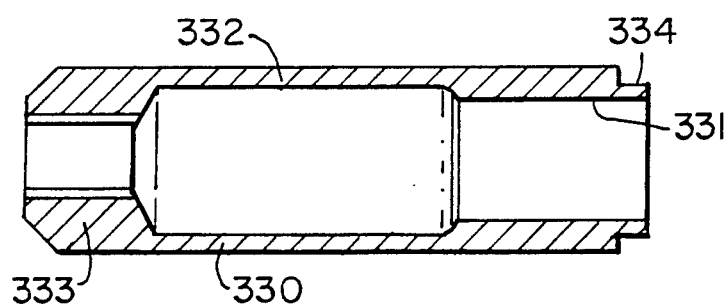
Figure 31C:
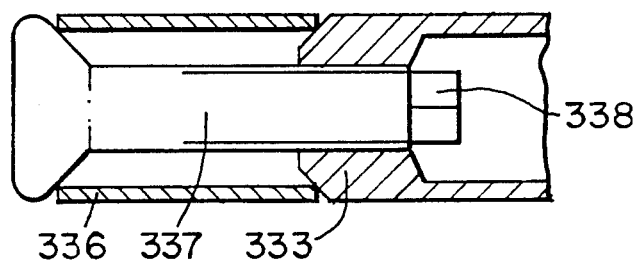
Figure 31D:
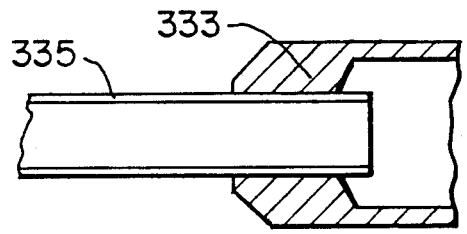

FIGS. 16A–16E are, respectively, an end view of the cylindrical part of a locking unit which is a modified form of the unit of FIGS. 15A–15C, a diagrammatic vertical section through an upper portion of the cylindrical part, a diagrammatic side view of an upper portion of the sliding rod assembly of the unit, a view similar to FIG. 16F showing parts of the sliding assembly in a separated condition, an under plan of the locking ring of the sliding assembly and a top plan of the locking ring;

FIG. 17 is a side view of a releasable coupling device embodying the invention comprising a body member which can be plugged into a socket part;

FIG. 18 is a cross-section through the device of FIG. 17;

FIG. 19A is a diagrammatic side view of the device of FIGS. 17 and 18 on a reduced scale and in an engaged condition;

FIG. 19B is a vertical cross-section through FIG. 19A; FIGS. 20A–20C are diagrammatic cross-sections through the plug-in body member of the embodiment of FIG. 19 showing the respective positions in a locking sequence thereof;

FIG. 21 is a diagrammatic cross-section through a modified embodiment of the releasable coupling of FIG. 19 wherein the socket part is open ended;

FIG. 22A is a side view of an end portion of a plug-in connector of a further embodiment of a releasable coupling in accordance with the invention;

FIG. 22B is a cross-section through the end portion of the plug-in part when engaged in a socket part of the coupling;

FIGS. 23A–23C are diagrammatic cross-sections through a portion of the socket part of FIG. 22B showing different positions of an internal locking mechanism thereof during a locking sequence;

FIGS. 24A and 24B are diagrammatic cross-sections through a locking mechanism embodying the invention for use on an elongate member such as a wire, rope, bar or tube, the mechanism being shown in an unlocked and locked condition respectively;

FIG. 25 is a diagrammatical cross-sectional detail of an alternative form of frictional gripping means;

FIGS. 26A and 26B are diagrammatic cross-sectional views of a device similar to that shown in FIG. 24 but adapted to be sensitive to the running speed of the elongate through the device, the locking mechanism thereof being shown in a free condition and a locked condition, respectively;

FIGS. 27A and 27B are diagrammatic cross-sectional views through a further form of locking mechanism embodying the invention for providing a friction lock with a piece of bar stock with the device being shown in an unlocked and a locked condition, respectively;

FIGS. 28A and 28B are, respectively, a side view of a lock body provided with a locking mechanism according to the invention and a cross-sectional view thereof when engaged in a tubular element;

FIGS. 29A and 29B are, respectively, a side view and a cross-sectional view of a socket for location in a wall or partition member to receive a plug-in type locking mechanism as illustrated in FIG. 32 of the drawings;

FIG. 30 is a cross-section through another form of wall mounted socket for receiving a locking mechanism of the type shown in FIG. 32;

FIGS. 31A and 31B illustrate, respectively, a side view and a cross-section through a further type of wall mounted socket for receiving a locking mechanism of the type shown in FIG. 32;

FIGS. 31C and 31D illustrate, respectively, fragmentary cross-sections through the socket of FIGS. 31A and 31B showing securing means therefor;

FIGS. 32A, 32B and 32C illustrate, respectively, a side view, a transverse cross-section, and a longitudinal cross-section through a plug-in type mechanism according to the invention for cooperating with wall mounted sockets of the type illustrated in FIGS. 13 to 15;

FIG. 33 is a diagrammatic front view of a safety harness or safety belt securing lanyard for cooperation with the plug-in locking mechanism shown in FIG. 32;

FIG. 34 is a diagrammatic front view of the lanyard securing means of FIG. 33 provided with a housing element for receiving and retaining the lanyard end attachment hooks;

FIG. 35 is a plan view of the assembly of FIG. 34; and,

FIG. 36 is an end view of the hook housing shown in FIGS. 34 and 35.

Figure 1:
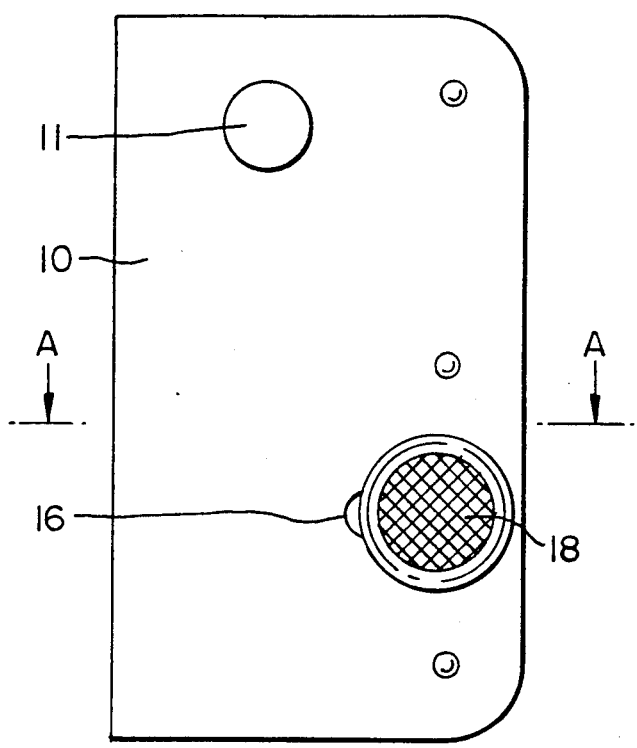
FIG. 1 is a front view of a rope gripping device embodying the invention.
Figure 2:
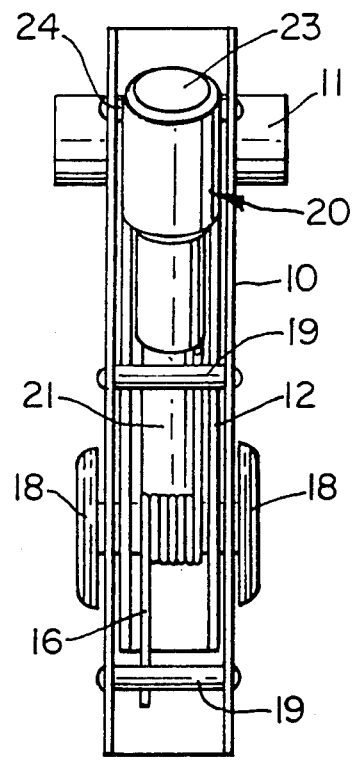
FIG. 2 is a side view of the device of FIG. 1.
Figure 3:
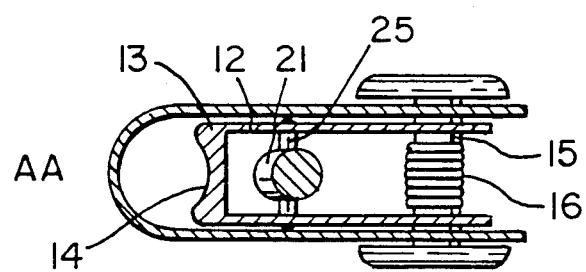
FIG. 3 is a cross-sectional view along line A—A in FIG. 1.

Referring to FIGS. 1 to 5, there is shown a first embodiment of a rope grip according to the invention. It will be appreciated that the device can be used for gripping other forms of elongate members than ropes, for example rods or tubular rod-like members which may be rigid or flexible members. The rope gripping assembly comprises a body part (10) in the form of a plate member formed into a generally U-shape when viewed in cross-section as seen in FIG. 3. A cylindrical mounting pin (11) extends through aligned apertures in the side plate portions of the body part (10) and projects outwardly thereof to provide a pair of mounting trunnions. A gripping cam member (12) is pivotally mounted between the side flanks of the body part (10). The cam is also formed as a U-shaped member in cross-section as seen in FIG. 3 and is generally triangular in shape when viewed from the side as seen in FIG. 4. The base portion of the cam is formed with an arcuate cam engagement surface (13) formed with a curved groove (14) in its engagement surface, of progressively increasing depth in the direction from the top portion of the cam surface (13) to the bottom portion thereof. The cam is pivotally mounted on a spindle (15) which extends through aligned slots (16A) in the flanks of the body part (10) and through aligned apertures in the side flanks of the cam member (12). A torsion spring (16) acts on the spindle (15) to bias the cam in the direction towards the base of the body part (10) so as to exert a light pressure against a rope or other elongate member (17) threaded through the device. Finger grips (18) are affixed to the portions of the spindle (15) which projects outwardly of the flank portions of the body part to facilitate gripping thereof so as to move the spindle and the cam against the biassing pressure of the torsion spring (16) away from the base of the body part thereby opening the gap therebetween to assist in a threading operation of a rope through the device. As seen in FIGS. 2 and 4, the opposite end portions of the torsion spring (16) act against fixed pins (19) extending between the flank portions of the body part (10).

The operation of the gripping cam (12) is controlled by a locking unit, or control means (20), including a telescoping assembly which comprises a rod (21) slidably received in a cylindrical bore (22) of a casing part (23). The closed end of the casing part (23) is pivotally mounted on a fixed pin (24) extending between the flank portions of the body part (10) and the free end of the rod (21) is pivotally mounted on a fixed pin (25) extending between the flank portions of the cam member (12).

The cylindrical bore (22) of the casing at its closed end has an enlarged diameter portion (26). The end of the rod within the casing (23) is formed with a transverse slot (27) to receive a rotary locking pawl (28) which is generally rectangular in cross-section and has a pair of notches (29) formed in the opposite smaller end surfaces thereof. The pawl (28) is rotatably mounted on a fixed pin (30). An axial bore (31) is formed in the end surface of the rod to intersect the slot (27). A spring-loaded control ball assembly (32) is located within this bore (31) and retained therein by any suitable means acting on the free end of the compression spring loading the ball. The ball acts on the peripheral surfaces of the cam (28) to temporarily locate the cam in a series of angular positions during latching and unlatching sequences which will be described below.

In the released position of the rope gripping device, as illustrated in FIG. 4, the rod (21) is prevented from moving further out of the casing (23) by latching engagement of the pawl (28) with the annular shoulder formed between the smaller and larger diameter portions (22 and 26) of the bore in the casing so that the cam is restrained from pivoting in an anti-clockwise direction about pivot (15). In this position, the rope can be freely moved in a downward direction and the cam member (12) is restrained from pivotal movement into a gripping position in which downward motion of the rope is arrested. In order to render the rope grip operative to arrest downward movement of the rope, the rope is first hauled in an upward direction which causes the cam to rotate in a clockwise direction about pivot (15). This causes rod (21) to be slid further into the casing (26) so that the latching pawl (28) is disengaged from the annular shoulder between bore sections (22 and 26). On such disengagement, the control ball (32) acts on the pawl to rotate it about pin (30) into a disposition in which its longer sides are generally transverse to the axis of the rod. When the rope is then subsequently moved downwardly, the frictional grip with the cam causes the cam member to rotate anti-clockwise and this motion is then no longer restrained by the latching pawl. When the pawl engages the aforesaid shoulder, it then does so with its lower longer side and such engagement causes the pawl to rotate to a position in which its longer sides are generally parallel to the axis of the rod as illustrated in FIG. 5. The cam is therefore free to continue to rotate anti-clockwise and its camming surface (13) is so shaped that such motion causes the cam to dig in to the rope and jam it firmly against the base portion of the body part (10) thereby fully locking the rope against further downward movement, as illustrated in FIG. 5.

In order to release the rope again, the rope is once more hauled upwardly thereby causing the cam to rotate in a clockwise direction about its pivot (15) to a position in which the rotary cam is once more positioned in the enlarged diameter portion (26) of the bore in the casing (23). When located therein, the spring bias control ball (32) moves downwardly until it is engaged in the base portion of the V-shaped notch (28) in the upper peripheral edge of the pawl (28), in which position the pawl projects slightly outwardly of the slot (27) so that on subsequent downward movement of the rope and therefore the cam member (12) and the rod (21), the shoulder in the casing bore is received in the V-shaped notch in the lower edge of the cam causing a latching condition as illustrated in FIG. 4 in which free downward movement of the rope is permitted.

Figure 6:
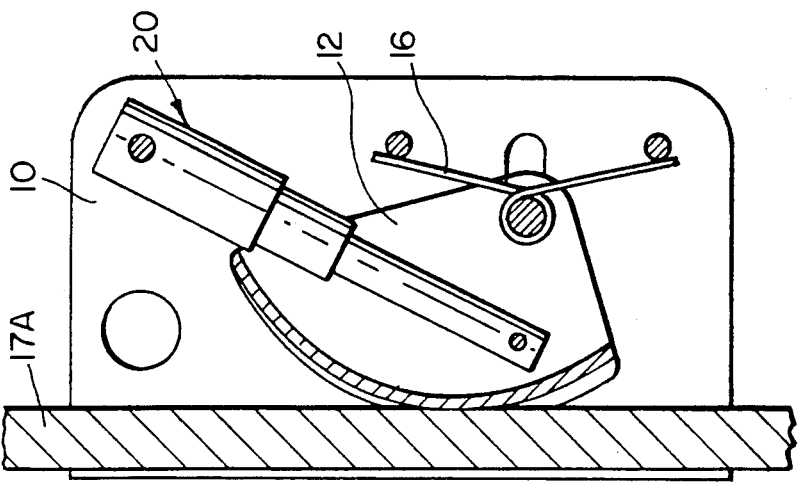
FIG. 6 is a diagrammatic vertical section through the device of FIGS. 1 to 5 shown in a released ready condition when a rope of smaller diameter than that illustrated in FIG. 4 is engaged with the device.

FIG. 6 illustrates a smaller diameter rope (17A) engaged with the above-described rope grip whereby the cam (12) is biassed into engagement with the smaller diameter rope (17A) by the torsion spring (16).

Figure 7:
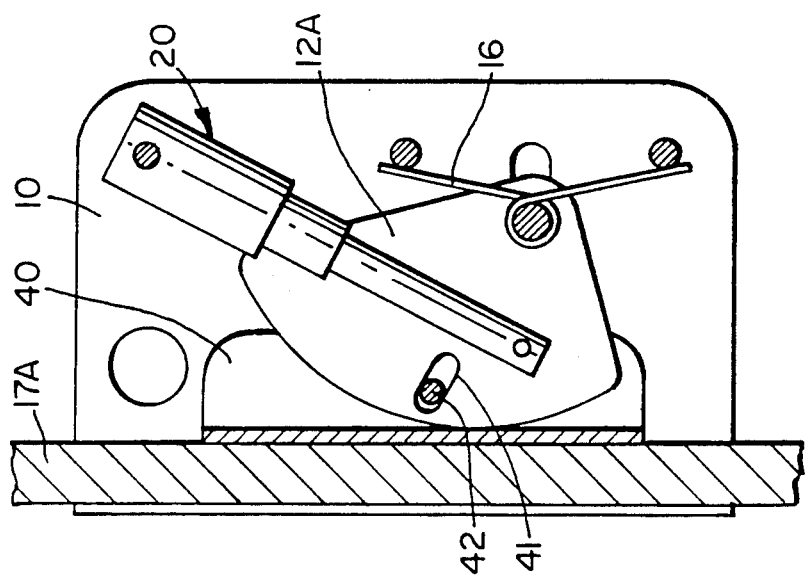
FIG. 7 is a diagrammatic vertical sectional view through a second embodiment of a rope gripping device according to the invention.

FIG. 7 shows a modified embodiment in which the cam (12A) is provided by a single plate member and a U-section pressure plate (40) is acted upon by the arcuate camming surface to provide the frictional engagement with the rope (17A). The cam is formed with an obliquely extending slot (41) through which a pin (42) extends, the pin being fixedly located to the side flanks of the pressure plate (40). The shape of the arcuate camming surface of the cam (12A) and the direction of the slot (41) enables an even pressure to be applied along the gripping surface of the pressure plate where it engages the rope (17A). The operation of this embodiment is generally similar to that described above in relation to the first embodiment.

Figure 8:
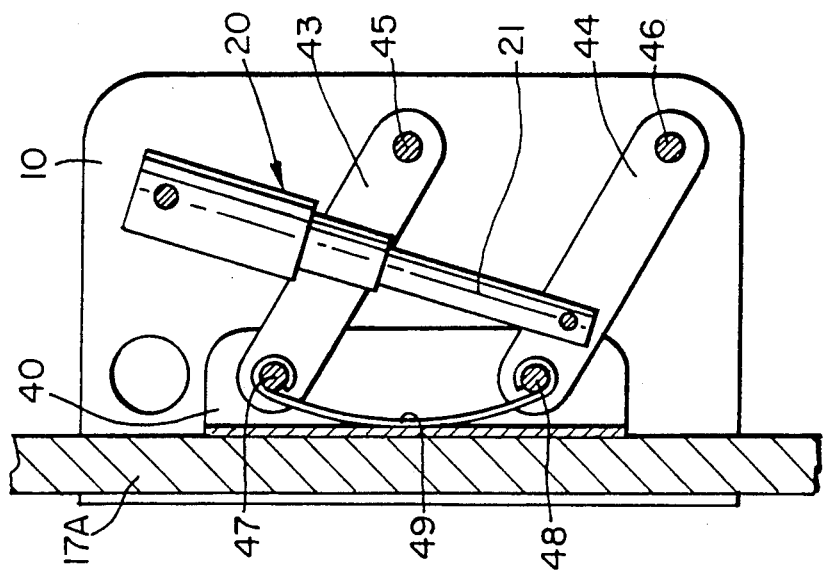
FIG. 8 is a diagrammatic vertical cross-sectional view through a third embodiment of a rope gripping device according to the invention.

FIG. 8 shows an alternative embodiment in which the pressure plate (40) is controlled by a pivotal linkage instead of the pivotally mounted cam. The linkage comprises a pair of parallel links (43,44) pivotally mounted at a first pair of ends thereof on pins (45,46) fixed to the flank portions of the body part (10) and pivotally mounted at their opposite ends on pins (47,48) associated with the flank portions of the pressure plate (40). The swinging movement of the links (43,44) is controlled by a locking unit (20), which corresponds to the above-described locking unit of the previous embodiments, the free end of the rod (21) of this unit being pivotally connected to the lower link (44). The pins (47,48) are engaged in slots in the flank portions of the pressure plate (40) to allow relative movement of the pressure plate to accommodate different size diameters of rope (17A). The pressure plate is biassed against the rope by a leaf spring (49), the ends of which are engaged with the pins (47,48), respectively. The operation of this embodiment is generally similar to the previous embodiments and will therefore not be described further.

Figure 9:
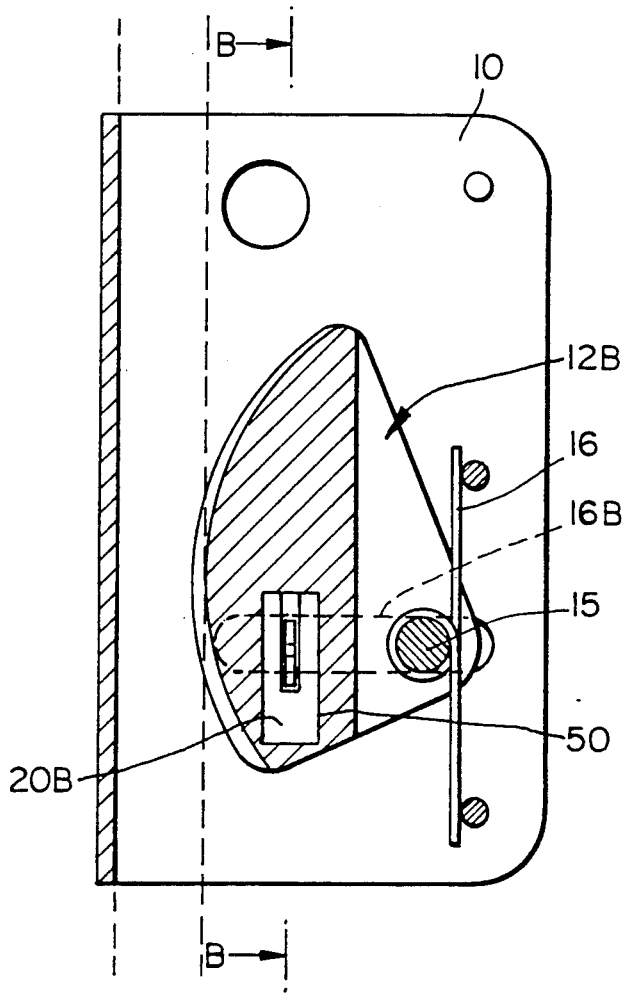
FIG. 9 is a vertical cross-sectional view through a fourth embodiment of a rope gripping device according to the invention.
Figure 10:
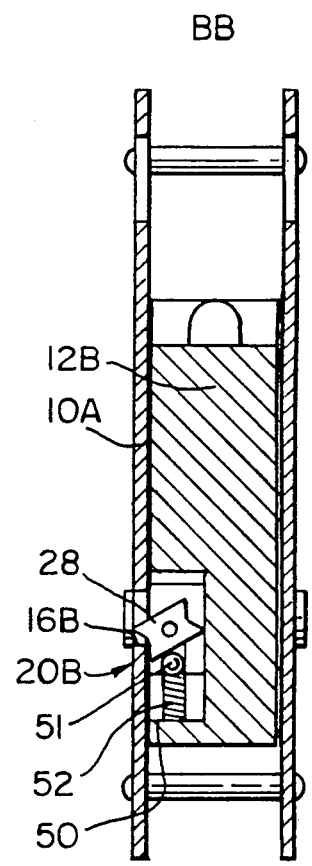
FIG. 10 is a cross-sectional view along the line B—B in FIG. 9.

The embodiment shown in FIGS. 9 and 10 utilizes the general form of the gripping device of FIGS. 1 to 5 and employs a similar body part (10) and locking cam (12B) pivotally mounted on a spindle (15) and biassed towards a rope under the action of a torsion spring (16). However in this embodiment, the cam (12B) is a generally solid member and the locking unit (20B) is incorporated in the cam to lock directly with respect to a side flank portion (10A) of the body part (10). In this embodiment, the slot (16B) in the flank portion (10A) has a longer extent in the corresponding slot (16A) of the first embodiment and forms one part of the control unit (20B). The rotary pawl (28) is located in a cavity (50) formed in a side face of the cam member (12B) with the spring bias control ball (51) located in a bore (52) formed in the cam (12B) to act on and position the pawl during locking and release cycles. With the pawl locked in the slot as shown in FIG. 10, the cam (12B) is prevented from rotation anti-clockwise into jamming engagement with a rope. In order to obtain a locking function, the rope is as before, hauled upwardly in order to rotate the cam clockwise so that the locking pawl (28) is positioned by the control ball (51) with its longer sides generally horizontal as seen in FIG. 10 and projecting into the slot (16B). When the rope is then hauled downwardly, the cam member is rotated anti-clockwise and the cam member engages the bottom wall of the slot with its lower longer peripheral edge, which is unnotched, whereby the cam is rotated to a position in which it is contained fully within the cavity (50) in the camming member which is then brought into position jamming engagement with the rope. In order to release the rope, it is again hauled upwardly to rotate the camming member anti-clockwise about its pivot (15) whereby the spring bias control ball then acts on a notched peripheral surface of the pawl (28) to bring it into a position whereby that notched lower edge projects slightly into the slot (16B) so that on subsequent downward movement, the lower edge of the slot becomes latched in the notched edge of the cam as shown in FIG. 10.

Figure 11:
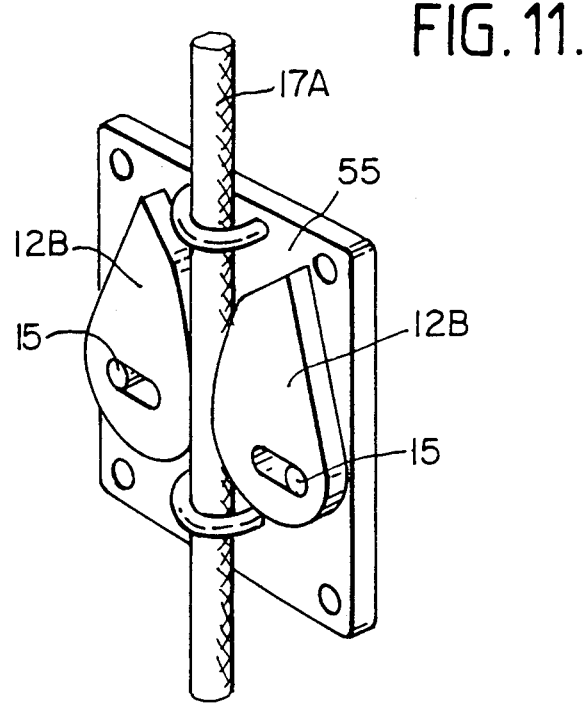
FIG. 11 is a diagrammatic perspective view of a further embodiment of a rope gripping device in accordance with the invention.
Figure 12:
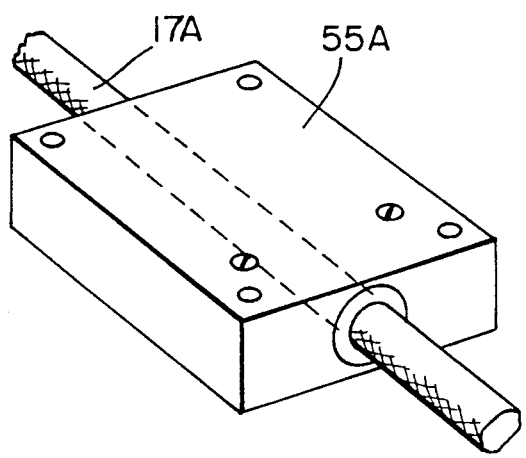
FIG. 12 is a diagrammatic perspective view of the device of FIG. 11 with a cover fitted thereover.

FIG. 11 shows an embodiment which is closely based on the construction as shown in FIGS. 9 and 10. In this case, a pair of cam members (12B) are pivotally mounted on a common base plate (55) with their arcuate camming surfaces facing one another. The cams have the same form and operation as the cam (12B) in the FIGS. 9 and 10 embodiment with locking pawls, not illustrated in FIG. 11, providing a locking control unit in conjunction with juxtaposed elongate slots provided in the base plate (55). A rope is fed between the two cam members which are initially held by the locking cams in a release position. When it is required to arrest further downward movement of the rope, the rope is first hauled upwardly to rotate the cams about their pivoting spindles (15) in directions away from one another which causes unlocking of the latching pawls controlling the cams so that on subsequent downward movement of the rope, the cams are free to fully rotate towards one another thereby firmly gripping the rope and arresting further downward movement thereof. This construction can be used in dispositions other than horizontal dispositions, to provide an automatically operable locking cleat device which can be operated from a remote location by applying suitable hauling forces on the rope from that remote location. In use, the unit will be provided with a cover (55A) as shown in FIG. 12 so that the mechanism becomes totally enclosed.

FIGS. 13A-13D illustrate another embodiment in which a locking unit having the same constructional form as the control unit (20) described above is used as a readily releasable catch in conjunction with a slidable shuttle member used in conjunction therewith. However in this embodiment, the locking unit (20C) has a spring bias acting between the closed end of the casing unit (23C) and the opposed end of the rod (21C) biassing the rod in the direction outwardly of the casing towards the shuttle (60). The shuttle (60) which is movable in a generally cylindrical housing (61) has an annular notch (62) in its outer periphery, the notch having a generally radial upper portion and an obliquely slanting lower portion. Above the notch (62), the shuttle has a reduced external diameter compared to the lower portion thereof which is a sliding fit in the cylindrical housing (61). The locking unit (20C) is fixedly secured to the external surface of the housing (61) and the rod (21C) projects through an aperture in the wall of the housing. The end of the rod has an oblique surface corresponding to the oblique lower surface of the notch (62).

A sequence of operation is illustrated in FIGS. 13A-13D. In FIG. 13A, as the shuttle is moved upwardly, the lower inclined surface of the notch (62) engages the correspondingly inclined end portion of the rod (21C) to move it inwardly of the casing (23C) whereby the pawl is located in the enlarged end portion of the bore in the casing allowing it to be rotated to a release or unlatched condition as described above in relation to the embodiment of FIGS. 1 to 5. On subsequent downward movement of the shuttle (60), the rod in its released condition is urged into the notch (62) under the aforesaid spring bias acting thereon so that it becomes locked as shown in FIG. 13B. On subsequent upward movement of the shuttle (60), the rod (21C) is again pushed into the casing (23C) such that the locking pawl is then positioned by the spring bias control ball acting thereon such that on subsequent downward movement of the shuttle (60) from the position shown in FIG. 13C, the locking pawl becomes latched with the shoulder between the smaller and larger diameter portions of the bore in the casing (23C) so that it does not fully engage in the notch (62) allowing the shuttle to move downwardly to the position shown in FIG. 13D. This sequence of operation is repeated for further locking and release operations. In order to prevent disengagement of the end of the rod (21C) from the peripheral surfaces of the shuttle (60), it is necessary to provide annular end stops (63) as illustrated in FIG. 13C, to ensure that the above-described sequential locking and release cycles of the control unit (20C) are maintained. If the shuttle is moved completely past the rod (21C) in an upward direction, then the rod which is biassed in the outward direction would engage end surfaces of the shuttle and prevent subsequent movement thereof. If more upward movement of the shuttle is required and an annular end stop is not provided, a longer radial shoulder (64), as illustrated in FIG. 13C, can be substituted.

This type of locking system can be used in conjunction with ropes, for example at a mast head where it may be desirable to provide a readily releasable locking function which can be operated at a remote location at deck level merely by applying hauling forces to the rope. Such a system could also be used in connection with a scaffolding system providing readily releasable locking facilities for scaffolding sections.

Such a system could also be used as a door or cabinet closure. It could be used as a catch to secure a loft hatch. As the unit is used as a catch, the load is taken in shear across the plunger. The catch acts in effect as a direct load but the load bearing capabilities are proportional to the strength of the plunger rather than that of the latching pawl.

Figure 14A:
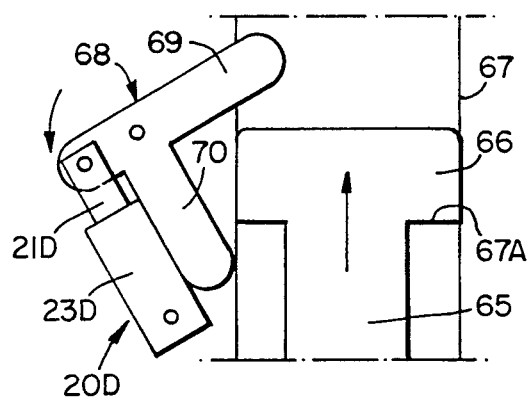
FIGS. 14A–14D are diagrammatic representations of a modified form of a releasable locking assembly in accordance with the invention shown in four respective positions of a locking and release sequence of operation thereof.
Figure 14C:
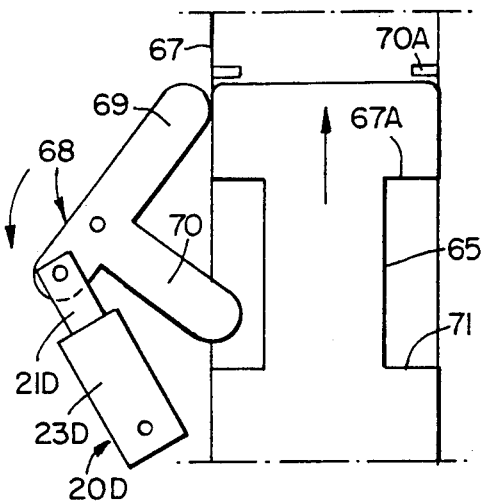
Figure 14B:
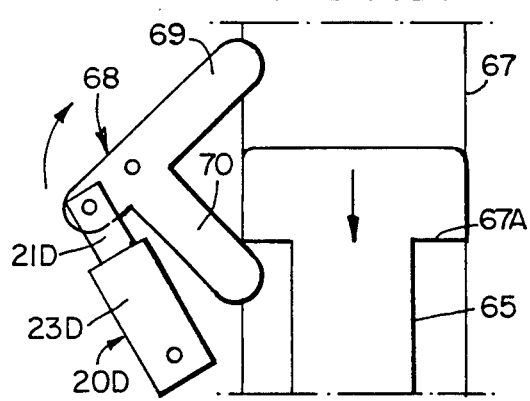
Figure 14D:
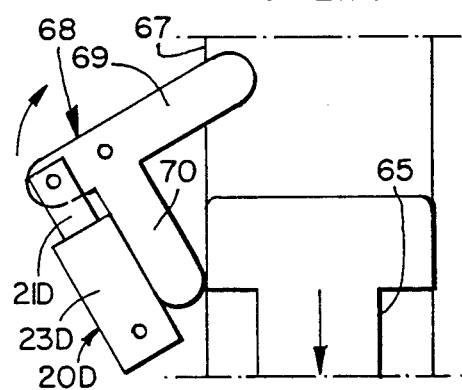

FIGS. 14A to 14D illustrate a modified embodiment of the locking arrangement shown in FIGS. 13A-13D. In this case, the shuttle (65) has an upper head portion (66) slidably received in tubular housing (67) and a lower reduced diameter portion (65) defining an annular shoulder (67A) therebetween. The lock mechanism (20D) has its casing portion (23D) pivotally connected with respect to a portion fixed to the housing (67). The rod (21D) of the locking unit is pivotally connected to a rotary toggle member (68). The toggle member has a cross-piece (69) which projects through a slot in the wall of the housing (67). It further has a depending leg section (70) which also can engage through a respective slot provided in the wall of the housing (67). The piston rod is pivotally connected to one end portion of the cross-piece (69). A locking and release sequence of this apparatus will now be described. In FIG. 14A, upward movement of the shuttle (65) engages the cross-piece (69) of the toggle member thereby rotating the toggle member in an anti-clockwise direction. This causes the piston rod (21D) to be moved into the casing (23D) whereby the rotary pawl is positioned as described above in relation to the embodiment of FIGS. 1 to 5, in a position so that on subsequent outward movement of the rod (21D), it becomes latched on the internal shoulder of the bore provided in the casing (23D). Therefore on subsequent downward movement of the shuttle (65), the radial shoulder (67A) thereof now engages the leg portion (70) of the toggle member, which now projects inwardly of the housing (67) so that the toggle member now rotates in the clockwise direction thereby causing a locking condition of the locking control movement (20D). Further downward movement of the shuttle (65) is therefore arrested. In order to release the shuttle, it is moved upwardly as shown in FIG. 14C such that it engages the cross-piece (69) of the toggle member causing the toggle member to rotate in an anti-clockwise direction. This causes the piston member (21D) to be moved inwardly of the casing (23D) whereby the rotary pawl is disengaged from the internal shoulder and is positioned by its spring bias control ball to a position whereby it will not interfere with subsequent outward movement of the control rod (21D) in relation to the casing (23D). Therefore on subsequent downward movement of the shuttle (65) as shown in FIG. 14D, the toggle is caused to rotate in the clockwise direction such that the leg portion (70) thereof is moved outwardly of the housing (67) which is permitted by the release condition of the control unit (20D) as described above. In this embodiment, an upper annular end stop (70A) is formed on the inner periphery of the housing (67) to prevent upward movement of the shuttle (65) whereby the radial shoulder (67A) thereof moves above the cross-piece (69) of the toggle thereby interfering with the above-described sequential locking and release sequence of the control unit (20D).

A second radial shoulder could be positioned on the shuttle (65) to prevent upward movement where an annular end stop (70A) in the housing (67) would be inappropriate. Toggle end (70) would engage in the recess between the two shouldered sections (66 and 71) and act as an end stop.

Free movement of the toggle (68) in conditions of vibration or sudden shock movements could be controlled by a frictional element about its pivot, or a frictional element between the piston member (21D) and the housing (23D) of the locking unit (20D), this acting as a damping element.

Such a system provides an indirect locking unit. It is useful for applications where the locking unit needs to be a sealed unit and remote from the main lock, which could be in a filthy environment. Possible applications include rope grips, tube clamps and scaffold staying adjusters of the general type described in the embodiments shown in British patent application No. 8819928.

FIGS. 15A-15C illustrate another form of locking unit which can be used in the rope gripping devices of FIGS. 1-7. The locking unit comprises a rod (80) slidably received in a cylindrical part (81) fixed in a casing (82) which is closed at its upper end. A latching member (83) is pivotally mounted within the upper end of the casing (82) with a spring biassed plate (84) acting on a flat upper end of the member (83) biassing it to a position, as shown in FIG. 15A, in which its depending elongate leg portion (85) is positioned to one side of the casing axis. A laterally extending peg (86) is provided at the end of the leg portion (85).

The upper end of the rod (80) is stepped inwardly portion (87). The side wall of stepped portion (87) is formed with a lower triangular lateral projection (88) and an upper lateral projection (89) spaced therefrom to form a latching keyway (90) therebetween. The upper surface of the projection (89) is a ramp surface (91) extending obliquely to the axis of the rod. The lower surface (92) initially extends generally parallel to the upper ramp surface (91). It is then formed with a hook formation (93) providing a detent for the peg (86) positioned generally above the apex of the triangular projection (88).

Figure 16D:
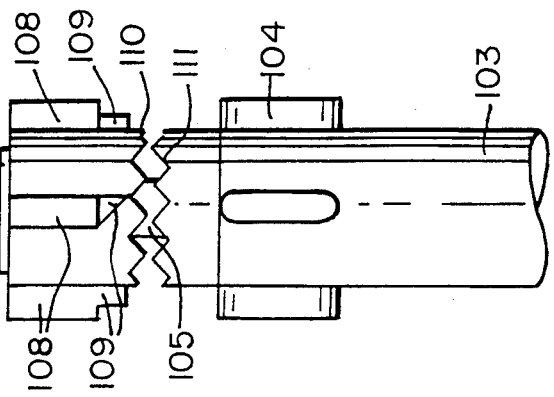
Figure 16E:
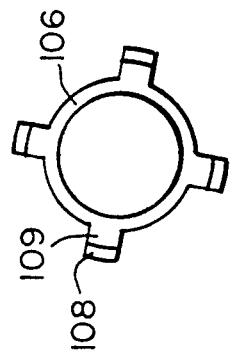

In operation, when the rod (80) is moved into the casing (82) from the release position shown in FIG. 15A, the peg (86) engages the oblique ramp surface (91) causing the latching member (85) to be pivotted against its bias. When the upper projection (89) passes the peg (86), the spring bias acting on plate (84) causes the latching member (83) to pivot so as to engage the peg (86) in the keyway (90) until it latches with the hook portion (93) as illustrated in FIG. 15B, whereby the unit is in its locked condition preventing free downward movement of the rod (80). In order to release the unit, the rod (80) is again moved upwardly whereby the peg (86) disengages from the hook formation (93) and passes out of the left-hand side of the keyway (90), under the spring bias on the latching member (83) so that on subsequent downward movement of the rod (80) the latching member (83) is disengaged from the latching keyway (90) and when the rod has moved sufficiently downwardly, returns to its position shown in FIG. 15A. FIGS. 16A-16E illustrate a further form of locking unit which can be used in the devices of FIGS. 1-7. The locking is similar to that of FIGS. 15A-15C but has a modified cylindrical part (100) and a modified sliding rod assembly (103). Furthermore, no pivotal latching member (83) is provided within the casing (82). In this modified locking unit, as seen in FIG. 16A, the cylindrical part (100) has a series of four deep, internal, axial recesses (101) spaced at 90° intervals and a series of four shallow, axial recesses (102) spaced at 90° intervals; the two series of recesses being offset at 45° with respect to one another. The shallow recesses (102) extend only a short distance into the cylindrical part (100) as seen in FIG. 16B.

Figure 16C:
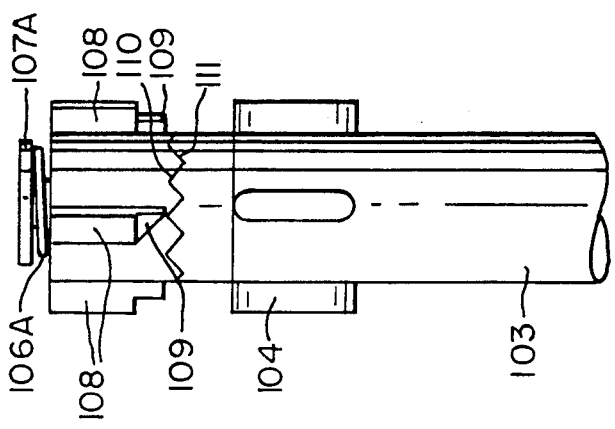
Figure 16A:
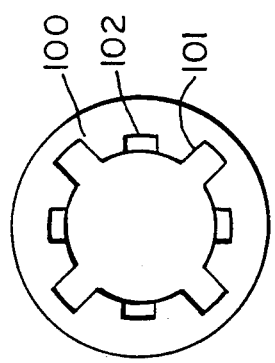
Figure 16B:
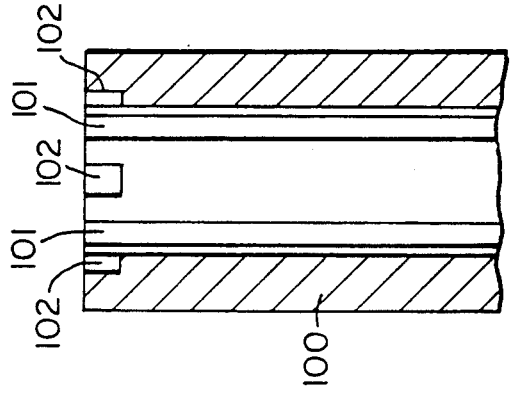

The upper end of the rod (103), as seen in FIG. 16C, has a series of external splines (104) spaced at 90° slidingly engaging in the deep recesses (101) in the cylindrical part (100). The upper end of the rod (103) has an integral, axial spigot (105) on which a rotatable locking ring (106) is mounted. An annular collar (107A) is located at the upper end of the spigot (105) to provide an abutment for a spring (106A) engaging in a recess in the upper end of the ring (106) and biasing the locking ring (106) downwardly. The locking ring (106) has a series of splines (108) which are spaced at 90° intervals in the circumferential direction. The lower part of each spline (108) is an inwardly stepped portion (109) which fits into the shallow recesses (102) in the cylindrical part (100). The leading edge of each inwardly stepped portion (109) is slanted as shown in FIGS. 16C and 16D so that when that portion engages in a shallow recess (102) or a deep recess (101) in the cylindrical part (100) during latching and unlatching sequences of the locking unit, the locking ring (106) is rotated in the direction of the arrow in FIG. 16F.

The locking ring (106) and the upper end of the rod (103) have mating serrations (110,111) normally in engagement with one another until the rod (103) is moved downwardly so that its upper end is contained within the cylindrical part (100). This movement causes the slanted leading edges of the stepped portions (109) of the locking ring splines (108) to engage in the shallow or the deep recesses (102,101) in the cylindrical part (100) depending on the orientation of the ring (106) causing disengagement of the serrations (110,111) and rotation of the locking ring (106) so that the serrations are misaligned as illustrated in FIG. 16D. If the splines (108) engage in the shallow recesses (102), then the downward movement of the locking ring (106) and hence the rod (103) is limited causing a locking condition of the locking unit. To cause unlocking, the rod (103) is moved upwardly again whereby the serrations (110,111) interengage causing further rotation of the locking ring (106) to the next indexing position whereby on subsequent downward movement of the rod (103) the splines (108) engage in the deeper recesses (101) in the cylindrical part (100). The first portion of the splines to so engage are the leading edges of the stepped portions (109) thereof causing disengagement of the serrations (110,111) with separation of the ring (106) from the upper end of the rod (103) as illustrated in FIG. 16D, with the locking ring (106) then being rotated with respect to the rod (103) to allow engagement of the splines (108) within the deep axial recesses (101) in the cylindrical part (100). This permits the rod (103) to slide downwardly within the cylindrical part (100) thereby providing an unlatched condition thereof. This sequence is repeated to bring about further latched and unlatched conditions of the unit on subsequent up and down movements of the rod (103) within the cylindrical part (100).

Another form of latching mechanism which can be incorporated in the locking unit is described in U.S. Pat. No. 4,709,454, the disclosure of which is incorporated herein by reference.

Referring to FIGS. 17-36 of the drawings, there are shown a number of different embodiments of locking or coupling devices which utilize a locking mechanism according to the invention provided on one of the cooperating parts for effecting, when actuated, a locking engagement with the other of those parts.

The embodiment shown in FIGS. 17 and 18 comprises a releasing locking device including a socket part (210) into which a body part (211) can be plugged, with a locking mechanism in accordance with the invention being provided on the body part (211). The socket part (210) has a generally cylindrical, blind cavity (212A) for receiving the body part (211) with an enlarged annular recess (213A) being formed adjacent the open end of the cavity (212A) for receiving parts of the locking mechanism associated with the body part (211), as described below.

The body part (211) comprises a generally cylindrical member formed with an axial bore (212) in one end thereof which merges into a smaller diameter bore (213) with a frusto-conical shoulder (214) therebetween. The bore (212) is formed with an annular undercut portion (215) and an annular recess (216) spaced therefrom. Just beyond the recess (216), on the side remote from the undercut (215), a plurality, i.e. 2, 3, 4 or more, of equiangularly spaced apertures (218) extend through the wall of the bore (212) to receive a corresponding number of locking balls (217). The walls of the apertures (218) converge slightly in a radially outward direction so as to hold captive the balls (217) whilst allowing them to project radially outwardly of the cylindrical periphery of the body member (211) in the locking position.

A control probe (219) is slidably mounted in the bore (212) and is formed with a smaller diameter end portion (220) which is slidably received in the narrower bore (213). The probe (219) is spring-loaded in the direction outwardly of the bore (212) by a compression spring (221) provided in the bore (213). In the unlocked condition of the locking mechanism, as shown in FIG. 18, the locking balls (217) are contained within the envelope defining the cylindrical periphery of the body part (211) and rest against the narrower diameter end portion (220) of the probe (219).

The free end surface on the larger diameter portion (222) of the probe is formed with a blind axial bore (223) and the portion (222) of the probe is formed with a diametrical slot (224) extending from its free end face along a major part of the length of that portion (222). A pawl (225) is rotatably mounted within the slot (224). The pawl (225) is generally oblong in shape having a pair of notches (226) formed in the opposite smaller sides of the periphery of the pawl. The rotary positions of the pawl are controlled by a spring-loaded ball (227) located in the bore (223) to act on the oblong peripheral surface of the pawl to temporarily locate the pawl in different angular positions thereof. The rotary pawl (225) provides a latching mechanism between the probe and the body member (211) as described below.

FIG. 18 illustrates an unlocked condition of the locking mechanism provided by locking balls (217). In this position, the rotary pawl (225) is located in the angular disposition thereof shown in FIG. 18 by the spring-loaded ball (227), such that it projects outwardly of the periphery of the pawl (225) to engage an abutment surface of the undercut portion (215) formed within the body member (211). This position is also illustrated diagrammatically in FIG. 20A. When the body member (211) is engaged in the socket part (210), the probe (219) engages the end wall of the cavity (212A) in the socket part and on further movement of the body member into the socket part, is displaced slidably with respect to the body part (211) until the rotary pawl (225) engages in the annular recess (216) as illustrated in FIG. 20B. When the probe (219) is in this position, it is again moved to an angular disposition under the influence of its spring control means such that it projects into the recess thereby latching with an end surface of the recess (216) thereby restricting movement of the probe (219) in the direction out of the bore (212) in the body part (211), as illustrated in FIG. 20C. In this disposition, the locking balls (217) are moved radially outwardly as they are engaged first by the frusto-conical shoulder between the smaller and larger diameter portions (220,222) of the probe to be maintained in their outward locking position, as shown in FIGS. 20B and 20C, resting on the periphery of the larger diameter portion (222) of the probe (219). This locking portion is shown in FIG. 19B wherein the locking balls (217) engage in the internal recess (213A) in the socket part (210) preventing withdrawal of the body part (211) therefrom.

In this latched condition of the rotary pawl (225) on the probe (219) with the end abutment surface of the internal recess (216) on the body part (211), which corresponds to a locked condition of the locking mechanism, the spring-loaded control ball (227) then acts against one of the pair of longer surfaces of the oblong periphery of the pawl. In order to release the locking mechanism, it is necessary to unlatch the pawl (225) and this is achieved by pressing the body part (211) into the socket (210) so that on abutment of the free end surface of the probe (219) with the base of the cavity (212A) relative movement between the probe (219) and the body part (211) takes place. The probe is then moved further into the bore (212) in the body part (211) so that the notch (226) in the pawl (225) disengages from the end abutment surface of the annular recess (216) in the body part (211). With the pawl disengaged from this abutment surface, it is then free to rotate and a small rotary motion of the pawl takes place under the influence of the resilient control means (227) until the parallel longer side surfaces of the periphery of the pawl are generally perpendicular to the axis of the bore (212) in the body part. The body part can then be moved in a direction to withdraw it from the socket part (210) so that the probe is then free to be urged outwardly of the bore (212) under the influence of the spring (221) which at this stage is in a partially compressed condition. This relative outward movement of the probe (219) with respect to the body part (211) is possible as a result of the above-described new disposition of the pawl (225) such that when the pawl engages the end abutment surface of the recess (216), it does so with one of its unnotched longer side surfaces whereupon the pawl is freely rotated against the spring control means (227) to a position which is contained completely within the periphery of the probe (219) with the spring-loaded ball (227) then acting on an end notched surface of the pawl. When the probe has moved outwardly of the bore (211) to a position in which the pawl (225) is opposite the undercut end section of the bore (212), the pawl is moved outwardly of the probe (219) to engage in this undercut as shown in FIG. 20A, under the influence of the spring-loaded ball (227) which then engages in the base of the corresponding notched end of the pawl. The locking balls (217) are then opposite the smaller diameter end section (220) of the probe (219) allowing them to move inwardly of the body part (211) thereby permitting free withdrawal of the body part (211) from the socket (210).

FIG. 21 shows a construction generally similar to that described above except that body part (211A) is adapted for locking engagement in an open-ended socket part (210A). In this embodiment, actuation of the probe (219A) is effected by an external sleeve (228) slidably mounted on the body part (211A) and having a pin (229) extending through a transverse slot (230) provided through the body part (211A) to form a connection between the smaller diameter portion (220) of the probe (219) and the sleeve (228). Actuation of the probe (219), to cause latching of the pawl (225) against the end wall abutment surface of the annular recess (216), as illustrated in FIG. 21, is caused by engagement of the sleeve (228) with the end surface of the socket part (210A) on insertion of the body member (211A) therein. The latching and unlatching sequence of the pawl (225) with the end abutment surface of the recess (216) and corresponding locking and unlocking of the balls (217) within the internal annular recess in the socket (210A) is in accordance with the sequences described above in relation to FIGS. 19 and 20.

FIGS. 22A and 22B illustrate an embodiment in which the locking mechanism is provided in the socket part (235) to receive and releasably lock a grooved pin (236) which can be engaged therein. The locking mechanism comprises a cylindrical cage member (237) having a cylindrical recess (238) in one end thereof to receive the grooved pin (236). The locking balls (239) are located in apertures (240) provided in the wall of the recess (238) and are shaped to allow the balls to project radially inwardly of the recess (238) in the locked condition. The rotary pawl (241) is located in a slot (242) extending from the other end of the cage body (237). A spring-loaded ball (244) for controlling the angular dispositions of the pawl (241), is provided in a bore (243) extending from the aforesaid other end of the cage body (237) along the slot (242).

The cage body (237) is located in the cavity in the socket part (235) with a compression spring (245) being provided between the base of the cavity and the opposing end surface of the cage body (237).

The cavity in the socket body (235) is formed with a first annular recess (246) providing an abutment surface at one end thereof, as in the previous embodiments, for the rotary pawl (241). The cavity is also formed with a second annular recess (247) having at one end thereof a shallower portion (248) for maintaining the locking balls (239) in a locked condition as described below.

The initial, free position of the locking mechanism is shown in FIG. 23A with the locking pawl (241) latched against the left-hand radial abutment surface of the recess (246). In this position, the cage body is held in an axial position within the socket body (235) such that the locking balls (239) are disposed at the left-hand end of the deeper portion of the annular recess (247), wherein they do not project radially inwardly of the recess (238) in the cage body (237). In this position, the grooved pin (236) can be engaged in the recess in the cage body (237) until it abuts the end wall thereof. Further movement of the pin (236) pushes the cage body (237) against the action of spring (245) to the position shown in FIG. 23B. The spring-loaded control means (244) acting on the pawl (241) rotates the pawl to the position shown in FIG. 22B, once it has disengaged from the radial abutment surface of the recess (246) in the position shown in FIG. 23A. The actuating force on the pin (236) is then removed and the compression spring (245) acts on the cage body (237) to move it to the position shown in FIG. 23C. This is permitted by the re-positioning of the pawl (241) as shown in FIG. 23B so that the pawl (241) is brought to its disposition shown in FIG. 23C as the cage body (237) moves in the leftward direction. In this position, the locking balls (239) are disposed in the shallower portion (248) of the recess (247) wherein they project radially inwardly of the recess (238) in the cage body (237). In this disposition, they engage in the annular groove (249) provided in the pin (236), as shown in FIG. 22B, thereby locking the pin (236) in the socket body (235). In order to release the pin (236), it is pressed into the socket body (235) so that the locking balls (239) are moved into the deeper portion of the recess (247) thereby disengaging from the groove (249) in the pin. When the locking pawl (241) is radially aligned with the recess (246) in the socket body, it is acted upon by the spring-loaded ball (244) which then rotates the pawl (241), from the position shown in FIG. 23C, in a clockwise direction until the ball (244) engages in the base of the V-shaped notch in the end surface of the pawl (241) with which it is engaged. In this position, the pawl projects into the recess (246) in such a disposition that on removal of the pin (236) accompanied by movement of the cage body (237) in the same direction under the influence of spring (245), the V-shaped notch in the opposite end of the pawl (241) receives a corner portion of the left-hand radial abutment surface of the recess (246), as shown in FIG. 23A, thereby latching the cage body (237) in that position with the locking balls (239) still within the deeper portion of the recess (247). The pin (236) can thereby be freely withdrawn from the locking mechanism and the socket body (235).

The embodiments described above comprise mechanically actuated locking mechanisms which are operated by a mechanical interaction between the two parts to be locked together and released from the locking condition.

FIGS. 24A and 24B illustrate a self-gripping locking mechanism for an elongate element extending through the mechanism, for example a tubular member, a cylindrical bar, a rope or a wire. The mechanism comprises an outer tubular housing (250) and an inner tubular ball cage (251) slidably located therein. A latching mechanism between the cage (251) and the housing (250) comprises a rotary pawl (252) located in a radial slot (254) provided in the wall of the housing (250), and a spring-loaded control ball (253) acting thereon and contained in a bore (255) provided in the housing wall. The pawl (252) has the same general form as that described in the previous embodiments and the spring-loaded control ball (253) angularly positions the pawl (252) during latching and unlatching sequences in accordance with those described in the previous embodiments. The cage (251) is provided with an annular recess (256) in its external surface with the upper radial end wall of the recess (256) providing an abutment surface with which the pawl (252) latches as shown in FIG. 24A.

The locking mechanism comprises locking balls (257) located in corresponding apertures through the wall of the cage (251). The positioning of the locking balls (257) is determined by an annular cam surface (258) in the internal surface of the housing at the lower end thereof. The cam surface (258) has an upper relatively deep portion (259) of a constant depth which allows the balls to take up a position in which they do not project inwardly of the inner periphery of the cage (251). The constant depth portion (259) of the cam surface (258) leads into a frusto-conical portion (260) which converges towards the lower end of the housing (250) causing the balls to move inwardly of the inner periphery of the cam (258) to a locking position when the cage (251) moves downwardly within the housing (250) to the position shown in FIG. 24B. Initially the cage (251) is latched in the upper position shown in FIG. 24A on engagement of the pawl (252) with the abutment surface provided at one end of the recess (256). In this position, the elongate member passing axially through the cage (251) and the housing (250) can be pulled freely downwards through the locking mechanism. The external side of the elongate member is such that there is a frictional engagement with the internal periphery of the cage (251) when the elongate member is moved therethrough. In order to effect a locking condition, the elongate member is moved in the opposite direction, namely upwardly thereby lifting the cage (251) sufficiently to allow the control ball (253) to act on the pawl (252) to rotate it to a generally horizontal condition such that on subsequent downward movement of the elongate member, whereby the cage (251) is also moved downwardly under the frictional contact therewith, the upper end abutment surface of the recess (256) now contacts a longer, unnotched, side surface of the pawl (252) so that it can be freely rotated to the generally vertical disposition shown in FIG. 24B allowing free downward movement of the cage (251). As the cage (251) moves downwardly towards the position shown in FIG. 24B, the locking balls (257) are moved inwardly into a locked condition with the elongate member as they move along the converging, frusto-conical portion of the cam surface (258). In order to subsequently release the locking mechanism from the elongate member, the elongate member is moved upwardly thereby moving the cage (251) upwardly sufficiently to allow the control ball (253) to position the pawl (252) within the recess (256) in the cage such that on downward movement of the elongate member and the cage (251), the cage becomes latched with respect to the housing (250) in the condition shown in FIG. 24A.

The locking balls (257) can be replaced by other suitable locking elements, for example rollers, wedges or serrated collets.

This type of mechanism can be mechanically activated by providing mechanical means for moving the ball cage (251) with respect to the housing (250) or it can rely solely on the frictional contact between the elongate member and the ball cage (51) as described above.

FIG. 25 illustrates alternative locking members in the form of wedge members (261 and 262) having either a female threaded edge (263) for engaging in an encircling male thread or a smooth gripping edge. The wedge members are constrained to move radially by horizontal slots (264,265) therein, through which pins (266), provided on a tubular support member (267) for the wedges, project. The tubular locking cage (268) in this embodiment has an outwardly flared lower end to cooperate with the inclined inner surface of the wedge members (261,262) to force the wedge members outwardly into locking engagement with the internal surface of an encircling component on relative axial movement of the cage (268) with respect to the tubular support (267). The latching mechanism described above in relation to FIGS. 24A and 24B is provided between the cage (268) and the support (267) to provide a similar locking and release action for this embodiment as described in that of FIGS. 24A and 24B with the relative movement between the cage (268) and the support(267) required for such locking and release being controlled by the aforesaid latching mechanism therebetween.

The embodiment shown in FIGS. 26A and 26B is generally similar to that shown in FIGS. 24A and 24B and like parts have been given similar reference numerals. The following description of this embodiment will therefore be limited to the modifications provided in the embodiment of FIGS. 26A and 26B. This embodiment comprises a locking mechanism for an elongate member (270), for example a rope or a wire allowing a normal free running of the rope downwardly through the device until a rapid acceleration at a predetermined set limit, is experienced at which the device is actuated to firmly grip the rope to arrest its downward movement through the device. The tubular cage (251A) has a modified upper end whereby the upper end radial abutment surface of the annular groove (256) for cooperation with the latching pawl (252) is provided by an annular collar (271) slidably mounted on an upper end portion (272) of the cage. The collar (271) is spring-loaded against a radially stepped portion (273) of the collar (251) adjoining the annular recess (256). With the rope (270) passing downwardly through the device in its latched condition shown in FIG. 26A which corresponds with the latched condition shown in FIG. 24A, the locking device remains in its unlocked condition. However on a rapid increase in acceleration of the rope (270), for example under a snatch load, the tubular cage (251A) is frictionally entrained by the rope (270) which will move downwardly against the action of the compression spring loading the collar (271), to the locked condition shown in FIG. 26A. On release of such load, the spring bias acting on the locking collar (271) will return the locking mechanism to its unlocked condition as shown in FIG. 26A. Otherwise the locking and unlocking conditions of the device are achieved by the same action as described in connection with locking and unlocking of the device shown in FIGS. 24A and 24B, required to cause latching and unlatching of the rotary pawl (252) with the locking collar (271).

FIGS. 27A and 27B show a locking mechanism for effecting a firm clamping engagement with a length of solid or tubular bar stock, for example a flat bar, a round bar, a square bar or an I-beam. The locking mechanism comprises a lock body (275) comprising a housing adapted to closely surround and generally correspond to the shape of the bar stock (276). On one side of the bar stock (276) the housing (275) contains the locking mechanism for acting against the bar stock (276). A rotary pawl (277) with a spring-loaded control ball (278) acting thereon is located in a slotted wall portion of the housing. An internal wall portion of the housing (275) below the position of the rotary pawl (277), is formed with a cam surface (279) for controlling a locking ball (280). A ball cage member (281) is located between the inner periphery of the wall of the housing (275) accommodating the latching device (277,278) and the locking mechanism (279,280) and is relatively slidable with respect to the housing (275). The cage has an aperture (282) for receiving the locking ball (280),and a further aperture (283) for receiving the latching pawl (277). An arcuate spring element (284) is located on the cage (281) to provide a frictional engagement with the bar stock (276). In the latched condition of the rotary pawl (277) in the aperture (283) of the cage as shown in FIG. 27A, free downward movement of the bar stock(276) through the locking mechanism is permissible. In order to effect locking of the bar stock, it is first moved upwardly to allow the pawl (277) to fully engage in the aperture (283) under the influence of the spring-loaded control ball (278). Subsequent downward movement of the bar stock (276) causes the corresponding downward movement of the cage (281) through the frictional engagement of spring (284) with the bar stock whereby the locking ball (280) moves along the lower inclined portion of the cam surface (279) effecting a jamming engagement with the bar stock (276) to the locked condition as illustrated in FIG. 27B. In order to release the bar stock (276) it is moved upwardly from the position shown in FIG. 27B until the rotary pawl (277) again engages in the aperture (283) in the cage under the control of the spring-loaded ball (278) whereby, on subsequent downward movement of the bar stock (276) together with the cage (281), the cage becomes latched in the position shown in FIG. 27A with a notched end portion of the pawl (277) receiving an upper edge portion of the aperture (283) in the cage (281).

FIGS. 28A and 28B illustrate an embodiment where a locking mechanism is provided on a plug-in connector member (290) to be releasably secured in a tubular member (291). The plug-in connector comprises generally cylindrical lock body (292) which carries the locking mechanism. The rotary pawl (293) is located in a cut-out portion (294) in the periphery of lock body (292) with the spring-loaded ball (295) being located in a bore formed in that cut-out portion. Below the cut-out portion (294) is formed a series of four equi-angular spaced cut-outs (296) having base surfaces formed to provide camming surfaces for the locking balls (297) disposed in those cut-outs (296), respectively. The camming surfaces have upper portions extending generally axially of the lock body (292) which merge into lower inclined ramp surfaces for thrusting the balls outwardly into locking engagement with the tube (291). An annular ball cage (298) encircles the lock body (292) and is formed with an aperture (299) for cooperating with the latching pawl (293) and four equi-angularly spaced apertures (300) for receiving respective locking balls (297). An arcuate spring strip (301) is also provided on the cage (298) to provide frictional engagement with the internal surface of the tube (291).

When the locking body (221) is plugged into the tube (291) as illustrated in FIG. 28B, frictional engagement between the spring (301) and the inner periphery of the tube (291) arrests the cage (298) within the tube (291) while the lock body (292) continues its downward movement unrestrained. This relative movement between the lock body (292) and the cage (298) allows the pawl (293) to disengage from the upper portion of the aperture (299) with which it is latched (as illustrated in FIG. 28B whereby the pawl is rotated under the influence of spring-loaded control ball (295) to a generally horizontal position within the aperture (299). Any subsequent movement to withdraw the lock body (292) from the tube (291) results in free upward movement of the lock body within the cage (298) as a result of unlatching of the pawl (293) therewith whereby the locking balls (297) are brought into locking engagement with the inner periphery of the tube (291) by the lower inclined ramp portions of the camming surfaces of the corresponding cut-out portions (296) in which they are located. Thus a firm locking of the lock body (292) in the tube (291) is effected. In order to release the lock body (292) from the tube (291), it is necessary to move the lock body (292) in the opposite direction further into the tube (291) to engage once more the rotary pawl (293) in the aperture (299) in the cage wherein it is set in an angular position by the spring-loaded control ball (295) such that it will latch with the upper edge of the aperture (299) (as illustrated in FIG. 28B on subsequent upward movement of the lock body (292). In this latched condition, the locking balls (297) bear against the upper axial portions of the camming surfaces of the cut-outs (296) so that they are out of locking engagement with the inner periphery of the tube (291). In this condition, the lock body (292) can be freely withdrawn from the tube (291). One possible application of this device would be for a scaffolding system allowing simple reliable locking together of the tubular sections thereof.

In all the above embodiments, the locking balls may be replaced by other suitable locking elements, for example locking rollers or locking wedge members or serrated collets.

The above described embodiments are merely illustrative of a wide range of different types of locking, coupling or support devices which can incorporate a locking mechanism in accordance with the invention. For example each of the constructions described in U.S. Pat. No. 4,644,617, the disclosure of which is incorporated herein by reference, could be adapted to employ a locking mechanism in accordance with the present invention.

Advantages of locking mechanisms embodying the invention include the following. The strength of the lock is not reliant on the pawl itself. The pawl merely effects a latching of a control member which actuates the locking mechanism whereby a relatively simple pawl mechanism can be utilized for a wide variety of load applications with the strength of the locking device being taken by the locking members and not the pawl. The simple pawl latching device can therefore operate the locking mechanism in applications where the applied load is several tons weight. The locking mechanism has the ability to lock on a wide variety of different elements such as tubular members, ropes, flat bar stock, beams of different shaped cross-sections, round bar stock and square bar stock. The mechanism can also be adapted to include a speed control mechanism of different sensitivities. Moreover locking mechanisms in accordance with the invention can more readily provide an evenly balanced seating around the cooperating peripheries of the components to be locked together.

The following are some examples or possible applications of locking mechanisms in accordance with the invention:

running of drill strings, valve operations (particularly hand wheels), domestic taps, lock bolts (mechanical or concrete), dead-mans operation of hoist, jacks, screw actuators, security locks (secondary and tertiary deadlocks), robotics, miniaturized applications such as wristwatch straps, belts, drives and clutches, drives and towhitches, electrical switches and plug gear, self-erecting scaffolding and storage and warehousing applications.

Referring now to FIGS. 13 to 20 of the drawings, there is shown examples of apparatus embodying a locking mechanism in accordance with the invention which is specifically adapted for providing a readily releasable plug-in connection means associated with an end attachment of a security lanyard connected to a safety harness or safety belt for releasably securing the wearer to a fixed structure. The plug-in unit is received in a socket part which is recessed into a fixed structure, for example a building wall. In prior art systems, for example for securing window cleaners to strong points provided on the interior surface of a wall adjacent the window, an unsightly projecting eyebolt is secured to the wall to which an end connector element of a safety harness lanyard can be secured. Similar eyebolt supporting points have been provided on the exterior surface of building walls for securing workmen who may for example be climbing ladders or moving around on scaffolding placed against the exterior wall. A system in accordance with the invention which uses recessed tubular receptor elements obviates the need for the above-mentioned unsightly projecting eyebolt for security attachment points.

FIGS. 29, 30 and 31 illustrate different constructions of receptor sockets for fixedly locating in a wall or partition member. The receptor socket of FIG. 29 is intended to be resin bonded within a cylindrical aperture formed in the wall structure. The socket comprises tubular metal part 310 formed with a reduced diameter entry neck portion 11 which is flared outwardly at its free end. A reinforcing collar 312 is located around the neck portion 311 and is either a press fit thereon, or swaged or spot welded thereon. The outer peripheral surface of the main body portion 310 of the socket has a knurled finish, as illustrated in FIG. 29A, to assist in resin bonding thereon within the wall aperture. An end wall 313 is provided within the larger diameter section of the tubular socket 310 spaced inwardly of the lefthand end thereof. The end wall 313 may be provided by a plastics cap or a blank washer crimped within the tubular socket. A cup-shaped slider 314 is provided within the socket part 310 and is dimensioned to slidably fit within the neck portion 311 thereof. The slider 314 has four equally spaced, axially projecting legs 315 with outwardly projecting barbs 316 at the free ends therefor for engaging the internal shoulder formed within the socket part 310 between the main body portion thereof and the neck portion thereof. With this construction the cup-shaped element 314 can be snap-fitted into the neck portion 311 of the socket part 310. A compression spring 317 acts between the end wall 313 closing the main body part of the socket 310, and the end wall of the cup-shaped slider 314.

An annular plastics cap 318 is snap-fitted over the outwardly swaged end of the neck portion 311 and provides an outwardly projecting annular abutment surface 319 for engagement with a surface surrounding the aperture in the wall into which the socket part is fixed in use.

FIG. 30 illustrates a construction of receptor socket part similar to that shown in FIG. 29, but adapted for use in a variety of different wall constructions. The description of this embodiment will be restricted to the differences between the two receptor socket constructions. The main body part of the receptor socket 320 at its end opposite from neck portion 311, comprises a frusto-conical portion 321 which converges inwardly to connect with an internally threaded smaller diameter tubular end section 322. Compression spring 317 acts between the internal surface of the frusto-conical portion 321 and the cup-shaped slider 314. The plastics end cap 318 of the FIG. 29 embodiment is replaced by an annular washer 323. This receptor socket may be resin bonded in an aperture in a solid wall or it may be retained by a threaded tensioning element 324 which engages in the threaded end portion 322 of the socket 320 with threaded retaining elements cooperating with the opposite end of the tensioning member 324 for engaging against an abutment surface through which the member 324 passes. If a tensioning element 324 is not provided, a plastics plug (not shown) can be fitted into the open end of threaded tubular portion 322 of the socket 320.

The receptor socket 330 illustrated in FIG. 31 is a part machined from a cylindrical bar stock. The outer surface of the bar is formed with a knurled finish. The bar stock is axially bored to have an initial neck section 331 which opens into a larger diameter central internal portion 332 which in turn converges into a threaded smaller diameter opposite end portion 333 The outer periphery of the bar is machined at the right-hand end thereof to form an annular step 334 on which an outwardly projecting washer can be located and swaged thereon similar to the washer 323 of the FIG. 14 construction.

As shown in FIG. 31D, the receptor socket 330 may be retained in a solid or cavity wall using a threaded stud 335 which engages within the internally threaded end portion 333 of the inner periphery of the socket 330. FIG. 31C illustrates a fixing system comprising an expansion collar 336 located between oppositely converging surfaces on the head portion of a threaded tightening element 337 and on the end surface of the socket part 330, respectively. The tightening element 337 has an hexagonal end portion 338 to enable the member 337 to be screwed into the threaded end 333 of the socket 330 thereby effecting expansion of the collar 337 to firmly grip against the wall of the surrounding aperture.

FIG. 32 illustrates a plug-in locking device for releasably engaging in a recessed socket part as shown in any of FIGS. 29 to 31. The locking device comprises a probe like member 340 having an axial bore which is closed at the forward end of the probe. Located within the bore of the probe 340 is a cylindrical locking control member 341 having a reduced diameter forward end portion 342. The opposite end of the control member 341 is formed with a blind bore 343 which is intersected part-way along its length by a diametrical slot 344 extending from the rear end of the control member 341 along the axial direction thereof. A rotary control pawl 345, similar to the rotary pawls in the previously described embodiments of the invention, is located within the diametrical slot 344 and the rotary position thereof is controlled by a spring-loaded ball 346 also in accordance with the previous embodiments. An annular recess 347 is formed in the internal surface of the probe 340 to cooperate with notched end surfaces of the pawl 345 in the latched condition thereof, again in accordance with the operation of the previously described embodiments. Four equi-angularly spaced bores 348 are formed through the wall of the probe 340 adjacent the forward end thereof to receive and locate locking balls 349, once again in accordance with previous embodiments. When the balls are in contact with the main body portion of the control member 341 they are maintained in their outwardly projecting locking position whereas when the control member is moved so that the reduced diameter end portion 342 of the control member is radially aligned with the balls, then the balls can be moved inwardly of the probe to allow release thereof. An apertured flange ring 350 is located in an external annular groove 351 is located on the outer periphery of the probe body 340 by a snap ring 352. The apertured flange ring 350 shown in FIG. 32 is formed with a slot 390 to accommodate a short length of lanyard which might be sewn to provide an aperture to engage the safety hook arrangement described below in relation to FIGS. 33 to 36.

A bulb-shaped actuator member 353 having an axial bore, is slidably mounted on the rear end portion of the probe 340 with a compression spring 354 acting therebetween. The actuator member 353 is retained on the probe 340 by a pin 355 engaging in diametrically opposed apertures formed in the wall of the actuator member 353 and passing through slots 356 formed in diametrically opposed portions of the wall of the probe 340 to engage in transverse apertures formed in the side walls of the control member 341 such that the actuator 353 and the control member 341 move together as a unit.

In order to permit the insertion of the plug-in locking device in a receptor socket of the types illustrated in FIGS. 29 to 31, the actuator 353 is moved relative to the probe 340 against the action of compression spring 354 in order to achieve release of the rotary latching pawl 345 from the latched condition thereof shown in FIG. 32C whereby subsequent release of the actuating mechanism 353 allows free movement under the action of compression spring 354 together with the control member 341 in a direction to the right as shown in FIG. 32C relative to the probe body 340 such that the reduced diameter tip portion 342 of the control member is in transverse alignment with locking balls 349 allowing them to move inwardly of the probe body during the insertion step. The latching and unlatching sequence of the latching pawl 345 under the control of spring-loaded ball 346 is in accordance with the latching and unlatching sequences of the rotary pawls described in the previous embodiments of locking mechanisms in accordance with the invention.

During the insertion step the spring-loaded cup-shaped member 314 is moved within the larger diameter portion of the body of the receptor socket 310 against the action of compression spring 317, on engagement therewith by the inner surface of the probe body 340. When the probe body 340 has been inserted sufficiently with the locking balls 349 to be within the larger diameter internal cavity of the receptor socket 310, the actuator member 353 is again moved relative to the probe body 340 against the action of compression spring 354 so that the latching mechanism, e.g. latching pawl 345 is brought to its latched condition shown in FIG. 32C whereby the locking balls 349 are maintained in the outwardly projecting locking position in which they engage against the internal step between the larger diameter central portion of the internal cavity of the receptor body 310, and the narrower diameter neck portion 311 thereof, thereby preventing withdrawal of the probe 340 from the receptor socket. For increased security in this locking condition, transverse aligned bores 357 are formed through the wall of the body part 340 and through a solid section of the probe 340. These bores are aligned when the control member 341 is in the locking position shown in FIG. 32C. A suitable locking member can then be inserted through these aligned apertures, if desired, in order to positively maintain the device in the locked condition to provide extra security when the device is plugged in a receptor socket.

In order to disengage the locking device, the actuator member 353 is again manually moved in the leftward direction as seen in FIG. 32C with respect to the probe body 340, against the action of spring 354, in order to release the latching pawl 345 from its latched condition allowing on subsequent rightward movement of the actuator 353 and the control member 341, the locking balls 349 to be moved to their unlocked condition in which they engage the smaller diameter end portion 342 of the probe 341. Locking device 340 can then be withdrawn from the receptor socket. The spring rate of compression spring 354 is greater than the spring rate of the compression spring 317 in the receptor socket in order to prevent accidental release of the locking mechanism when inserted in the receptor socket on an accidental contact with the actuator member 353, for example by a swinging window frame.

A double-ended safety lanyard or other attachment line 410 as described in British Patent 2,133,969, may be used in connection with a locking device as shown in FIG. 32. The lanyard 410 has secured to each of its free ends, a safety hook connector 411,412. The lanyard passes through an eyelet, e.g. a D-ring, shackle or hook 413 connected to a safety harness or a safety belt, the relative dimensions of the eyelet 413, the lanyard 410 and the hooks 411 and 412 being such that the lanyard can run freely through the eyelet 413 but the hooks 411 and 412 will not pass through the eyelet.

A hook grip 414 as illustrated in FIGS. 34 to 36, comprises a moulded plastics housing having centrally located slots 417 in its opposite walls to receive the eyelet 413. Opposite end sections of the housing 414 can receive and retain end portions of respective hook connectors 411 and 412 by means of pairs of inwardly extending depressions 415,416 formed in the side walls of the housing 414 adjacent respective opposite ends thereof.

Each safety hook 411 and 412 may be connected to the apertured flange 350 of a locking mechanism as shown in FIG. 32 so that the wearer can plug in to a series of recessed receptor sockets at different positions in a wall as he moves across the wall without even temporarily being released from a security detachment therewith. A first locking mechanism associated with one hook connector 411,412 is plugged in to a selected conveniently located receptor socket. When it is desired to move to a new location, a locking mechanism associated with the other connector hook at the opposite end of the lanyard 410 is plugged in to another conveniently located receptor socket before removal of the locking mechanism from the first receptor socket. Once the second connection has been securely made, then the first connection can be released to be used subsequently for a plug-in connection to a further connector socket before release of the locking device at the opposite end of the lanyard.

We claim:

1. A releasable gripping device which, in a non-gripping condition, is in sliding cooperation with an elongated member and for, in a gripping condition, gripping said elongated member to prevent continued relative movement therebetween in a first direction, said gripping device comprising:

a body part having an abutment surface adapted to have said elongated member slide therealong;

a gripping member;

mounting means movably securing said gripping member to said body part such that, in said gripping condition, the gripping member is initially in sliding contact with the elongated member and, when movement between the elongated member and the body part is in said first direction, the mounting means permits gripping motion of the gripping member to clampingly press the elongated member against said abutment surface to prevent continued movement between said gripping member and said elongated member in said first direction;

control means coupled to the gripping member for, in said non-gripping condition of the device, blocking said gripping motion of the gripping member and, in response to relative motion between the body part and the elongated member in a second direction opposite to said first direction, enabling the gripping motion of said gripping member to place the device in said gripping condition;

wherein said control means comprises a telescoping assembly having two components slidable relative to each other, and a locking member rotatingly coupled to one of said two components and including (a) positioning means to selectively set said locking member at a locking angle and a non-locking angle, (b) a locking surface, and (c) a non-locking surface, said locking surface in said non-gripping condition of the device, lockingly engaging a corresponding opposed surface on the other of said two components, preventing rotation of said locking member and blocking relative motion between said two components in a given direction responsive to motion between the gripping member and elongated member being in said first direction, when the positioning means sets the locking member at said locking angle.

2. The releasable gripping device of claim 1, wherein said locking surface and said corresponding opposed surface disengage in response to a predetermined amount of motion between said gripping member and said elongated member in said second direction causing motion of said two components in a direction opposite to said given direction, with said positioning means setting said locking member at said non-locking angle so that subsequent motion between said two components in said given direction engages said opposed surface on the other of said two components with said non-locking surface of said locking member to rotate said locking member and permit further motion in said given direction between said two components to place the device in said gripping condition.

3. The releasable gripping device of claim 2, wherein said positioning means alternates the setting of the locking member between said locking angle and said non-locking angle with each said motion between said two components in said opposite direction.

4. The releasable gripping device of claim 1, wherein said gripping member comprises a cam pivotally mounted on said body part and having a curved gripping surface shaped to cooperate with a spaced portion of the body part opposed thereto so as to form a narrow gap therebetween on rotation of the cam in one direction so as to grip said elongated member extending in use therebetween.

5. The releasable gripping device of claim 4, wherein said mounting means comprises
pivotal mounting means for the cam slidably mounted on the body part for movement toward and away from said spaced portion of the body part to facilitate threading of said elongated member through the device and to accommodate elongated members of different cross-sectional sizes, and
resilient means for biasing said pivotal mounting means toward said spaced portion of the body part.

6. The releasable gripping device of claim 5, wherein said gripping member comprises a pressure bar interlinked with the cam and acted on by said curved gripping surface of the cam to engage a gripping surface of the pressure bar with said elongated member.

7. The releasable gripping device of claim 4, wherein said control means comprises relatively slidable components and interengagable latching means actuated by relative movement of said components, said relatively slidable components of said control means include a telescopic strut pivotally mounted at one end thereof on the body part and coupled at the other end thereof to said cam to control the pivotal movement thereof.

8. The releasable gripping device of claim 1, wherein said mounting means permits the clamping motion of the gripping member to be initiated by the sliding motion between the gripping member and the elongated member.

9. The releasable gripping device of claim 1, wherein pivoting means couples the locking member to said one component for rotation around an axis transverse to a direction of relative motion between said two components.

10. A releasable gripping device which, in a non-gripping condition, is in sliding cooperation with an elongated member and for, in a gripping condition, gripping said elongated member to prevent continued relative movement therebetween in a first direction, said gripping device comprising:
a body part having an abutment surface adapted to have said elongated member slide therealong;
a gripping member;
mounting means movably securing said gripping member to said body part such that, in said gripping condition, the gripping member is initially in sliding contact with the elongated member and, when movement between the elongated member and the body part is in said first direction, the mounting means permits gripping motion of the gripping member to clampingly press the elongated member against said abutment surface to prevent continued movement between said gripping member and said elongated member in said first direction;
control means coupled to the gripping member for, in said non-gripping condition of the device, blocking said gripping motion of the gripping member and, in response to relative motion between the body part and the elongated member in a second direction opposite to said first direction, enabling the gripping motion of said gripping member to place the device in said gripping condition;
wherein said control means comprises two relatively slidable components and interengagable latching means actuated by relative movement of said components, said latching means having
an abutment on one of the components and a rotary pawl mounted on the other component for rotation between positions in which it does and does not engage with said abutment on relative movement of the components, said pawl being rotatable through complete rotations thereof, and
positioning means for positioning the pawl in a series of angular positions during a locking and non-locking sequence of said latching means corresponding, respectively, to said non-gripping and gripping conditions of the device, said positioning means comprising resilient means provided on said other component and engaged with the periphery of the pawl to temporarily locate the pawl in said angular positions during locking and non-locking sequences.

11. The releasable gripping device of claim 10, wherein the circumferential peripheral portion of the pawl has a generally parallelogram shape whereby said resilient means engage in succession each side of the parallelogram-shaped peripheral portion associated with the pawl as the pawl is rotated by said resilient means in accordance with engagement with and disengagement from said abutment so as to rotate and locate the pawl in the required angular position for the next step in a locking and non-locking sequence, said pawl having a pair of circumferentially opposed peripheral edges which are formed with recesses or notches to receive a corner portion of said abutment in a locking condition of the latching means.

12. A releasable gripping device which, in a non-gripping condition, is in sliding cooperation with an elongated member and for, in a gripping condition, gripping said elongated member to prevent continued relative movement therebetween in a first direction, said gripping device comprising:
a body part having an abutment surface adapted to have said elongated member slide therealong;
a gripping member;
mounting means movably secured said gripping member to said body part such that, in said gripping condition, the gripping member is initially in sliding contact with the elongated member and, when movement between the elongated member and the body part is in said first direction, the mounting means permits gripping motion of the gripping member to clampingly press the elongated member against said abutment surface to prevent continued movement between said gripping member and said elongated member in said first direction;

control means coupled to the gripping member for, in said non-gripping condition of the device, blocking said gripping motion of the gripping member and, in response to relative motion between the body part and the elongated member in a second direction opposite to said first direction, enabling the gripping motion of said gripping member to place the device in said gripping condition;

wherein said gripping member comprises a pressure bar movable toward and away from a spaced portion of the body part which is opposed thereto, and means for moving the pressure bar relative to the opposed portion, in a generally parallel relationship, including a pivotal linkage between the pressure bar and the body part.

13. The releasable gripping device of claim 12, wherein said mounting means includes means for movably mounting the pressure bar on the linkage toward and away from said spaced portion of the body part to facilitate threading of an elongated member through the device and to accommodate elongated members of different cross-sectional sizes, and means for resiliently biasing the pressure bar toward said spaced portion of the body part.

* * * * *